United States Patent [19]
Kishi

[11] Patent Number: 5,903,229
[45] Date of Patent: May 11, 1999

[54] JOG DIAL EMULATION INPUT DEVICE

[75] Inventor: Nobuya Kishi, Yamatokoriyama, Japan

[73] Assignee: Sharp Kabushiki Kaisha, Osaka, Japan

[21] Appl. No.: 08/800,385

[22] Filed: Feb. 14, 1997

[30] Foreign Application Priority Data

Feb. 20, 1996 [JP] Japan .................................. 8-032415

[51] Int. Cl.⁶ .................................................. H03M 11/00
[52] U.S. Cl. ............................. 341/20; 178/18; 345/173
[58] Field of Search .......................... 341/20, 33; 178/18; 345/157, 158, 173, 174, 339

[56] References Cited

U.S. PATENT DOCUMENTS 5,543,591 8/1996 Gilispie ..................................... 178/18
5,757,368 5/1998 Gerpheide et al. ..................... 345/339

FOREIGN PATENT DOCUMENTS 6-12493 1/1994 Japan .
7-104964 4/1995 Japan .

*Primary Examiner*—Michael Horabik
*Assistant Examiner*—Albert K. Wong
*Attorney, Agent, or Firm*—Nixon & Vanderhye PC

[57] ABSTRACT

A jog dial emulation input device includes: a pointing device for receiving coordinate data on a panel surface; and a rotation direction detector for determining a rotation direction of a user input to the panel surface to be clockwise or counter clockwise based on the coordinate data received by the pointing device.

12 Claims, 16 Drawing Sheets

$$\sqrt{(X_2-X_0)^2+(Y_2-Y_0)^2} < L_{min}$$

$S_{01} > S_{12}$ $S_{01} < S_{12}$ $((Y_0 > Y_1)$ and $(Y_1 > Y_2))$ and $(S_{01} < S_{12})$ $((Y_0 < Y_1)$ and $(Y_1 < Y_2))$ and $(S_{01} < S_{12})$

JOG DIAL EMULATION INPUT DEVICE

BACKGROUND OF THE INVENTION

1. Field of the Invention

The present invention relates to a jog dial emulation input device for use in a computer or the like for performing jog dial inputs such as for example, moving a cursor by making substantially circular strokes with a finger tip an the surface of the input device.

2. Description of the Related Art

A user using a computer or the like often gives a command for varying a parameter bidirectionally (e.g., up/down, left/right, increase/decrease, dark/light, positive/negative). For example, in order to select an article (e.g., a command or a choice) from a menu list including a number of articles arranged horizontally or vertically on a display screen, the user is required to move a selection cursor (i.e., pointer) via a mouse horizontally or vertically to the desired article. When drawing a picture on a display screen, it may be necessary to move the pointer exclusively in one direction (e.g., horizontally or vertically). Or, when setting a parameter such as, for example, a clock, font size, counter, thermostat, response parameter of the mouse, etc., the user may open a dialog box or the like and adjust (e.g., increase/decrease) the parameter in the dialog box. The following are other examples of operations where a bidirectional parameter is varied:

Scrolling the display upward/downward;

Enlarging/shrinking the display;

Moving video image frames forward/backward;

Adjusting the contrast, brightness, focus, tint, color, etc., of the display;

Adjusting the volume, tone, stereo balance, etc., for sound;

Selecting a channel on a TV (television), radio, etc.

For performing the above operations via a keyboard, the user can press one of a set of direction keys (e.g., arrow keys) so as to move the cursor or to increase/decrease a value or parameter. By using a mouse, the user can move the pointer/cursor by moving the mouse on a mouse pad in order to drag a scroll box up/down along a scroll bar to increase/decrease the value or parameter; or click an arrow box to increase/decrease the value or parameter.

Japanese Laid-Open Patent Publication No. 7-104964 describes an invention where an article is selected from the menu list using a stylus pen or the like. A gesture recognition area is provided for each article on a display screen. When the stylus pen is located in one of the gesture recognition areas, gestures of the stylus pen are recognized, thereby selecting an article associated with the region.

Japanese Laid-Open Patent Publication No. 6-12493 describes an invention where gestures of a stylus pen, a mouse or the like are recognized based on a DP (Dynamic Programming) matching method, which has been employed in, for example, voice recognition.

A jog dial input device has also been proposed as an input device specially designed for the bidirectional adjustment of a parameter. As shown in FIG. 24, the jog dial input device includes a jog dial 21 rotatably attached to a main body, and a concave portion 21a provided at an eccentric position on the jog dial 21. The user places his finger tip A on the concave portion 21a and rotates the jog dial 21, thereby generating jog dial pulses in accordance with the rotational direction he is moving the jog dial (e.g., two pulses having a phase lead or a phase delay depending an the rotation direction). The jog dial pulses are sent to the computer and received by a device driver of the computer which determines the direction of rotation (i.e., clockwise or counterclockwise) of the jog dial 21. The determined rotation direction is sent to an application program or the like which varies a bidirectional parameter according to the direction of rotation. By using the pulses generated by the jog dial as X-/Y-pulses (indicating relative changes in X-/Y-directions, respectively), it is also possible to control mouse location data. The amount by which a bidirectional parameter is varied is represented, for example, by the number of jog dial pulses. The method of varying a bidirectional parameter utilizing the clockwise/counterclockwise rotation generated by the jog dial input device has been employed, for example, in moving video image frames forward/backward and is believed to desirably match the human's thought process.

However, there is a problem in giving a command for varying a bidirectional parameter, for example, by pressing an arrow key on the keyboard. That is, when giving a long-stroke command to move the cursor to a relatively distant position or to vary a bidirectional parameter by a relatively large amount, the user has to repeatedly press the key or hold down the key for a long time to engage the key repeat function. Such an operation may be considerably bothersome.

When using a mouse for giving a long-stroke command for varying a bidirectional parameter by a large amount, the user has to move the mouse over a long distance or quickly (when the response parameter of the mouse is automatically adjusted). Moving the hand holding the mouse over such a long distance or so quickly may be a bothersome operation. Moreover, such a long mouse move may not be complete within the mouse pad area. For example, when the mouse reaches the edge of the mouse pad area during a mouse move, the user has to lift up the mouse and place it at the opposite edge of the mouse pad area, which is quite bothersome. Furthermore, when clicking an arrow box or the like on the display screen to vary a value or other bidirectional parameters (e.g., for darkening/lightening colors), the user has to repeatedly press the mouse button or hold down the mouse button for a long time. Such an operation is as bothersome as the above-described keyboard operation.

Using a stylus pen on a tablet provided separately from the display screen is just as bothersome as the mouse operation. FIG. 25 shows a stylus pen operation described in Japanese Laid-Open Patent Publication No. 7-104964, where a stylus pen 22 is operated on a separately-provided tablet 23. In FIG. 25, the user is moving a cursor bar 25 from choice 1 at the top of a display screen 24 to choice 5 at the bottom. In such a case, the user has to move the stylus pen 22 over a long distance while keeping the stylus pen 22 close to or on the tablet 23. Accordingly, the user has to move the hand holding the stylus pen 22 over a long distance, or the user may have to lift up the stylus pen 22 during the move and place it at the upper edge of the tablet 23 to complete the move. Such an operation may be bothersome, too.

These problems may be substantially eliminated by employing a jog dial input device with which the user can give a command for varying a bidirectional parameter simply by rotating the jog dial 21 with the finger tip A. However, providing a computer with the jog dial input device merely for giving such a command may not be practical because the input device not only causes the user an additional cost but also requires more space, for example, on the desk where the computer is used.

Japanese Laid-open Patent Publication No. 7-104964 describes a gesture recognition of the stylus pen or the like for selecting an article. Such a gesture recognition requires complicated computations. Japanese Laid-Open Patent Publication No. 6-12493 describes a gesture recognition based on a DP matching method, where a complicated computation such as for example Expression 1 below is performed to obtain angle θ.
(Expression 1)

$$\theta = \cos^{-1} \frac{VX_1 \cdot VX_0 + VY_1 \cdot VY_0}{\sqrt{(VX_1^2 + VY_1^2) \cdot (VX_0^2 + VY_0^2)}}$$

FIG. 26 shows a case where the stylus pen 22 or the like is moved from position $P_0$ to $P_2$ via $P_1$. The move from $P_0$ to $P_1$ is represented by a "previous" vector (i.e., a vector of the previous move) whose components are represented by ($VX_0$, $VY_0$), and the move from $P_1$ to $P_2$ is represented by a "last" vector (i.e., a vector of the last move) whose components are represented by ($VX_1$, $VY_1$). Then, the inner (scalar) product of the previous vector and the last vector is expressed as Expression 2 below.
(Expression 2)

$$VX_1 \cdot VX_0 + VY_1 \cdot VY_0$$

The inner product is also expressed as Expression 3 below, where θ is the angle defined by the previous vector and the last vector.
(Expression 3)

$$\sqrt{VX_1^2 + VY_1^2} \sqrt{VX_0^2 + VY_0^2} \cdot \cos\theta$$

Assuming that Expressions 2 and 3 are equal to each other, the angle θ defined by the vectors can be obtained by Expression 1 above. Herein, the angle θ is within the range of the principal value of the inverse cosine (0≦θ≦π). The angle in the range of −π≦θ≦π is obtained by adding negative/positive signs of components of the outer product of these vectors expressed as Expression 4. For example, when the direction of the outer product of the vector $P_0P_1$ and the vector $P_1P_2$ is positive, the sign to be added is also positive. When the direction of the outer product is negative, the sign to be added is also negative. However, it is also applicable that the sign to be added is negative when the direction of the outer product is positive, and the sign to be added is positive when the direction of the outer product is negative.
(Expression 4)

$$VX_1 \cdot VY_0 - VX_0 \cdot VY_1$$

Thus, in such a gesture recognition process, a complicated computation has to be performed for each location input from the stylus pen 22 or the like. This increases the load on the processing unit and, therefore, real-time operations become difficult to ensure.

SUMMARY OF THE INVENTION

According to one aspect of this invention, a jog dial emulation input device includes: a pointing device for receiving coordinate data on a panel surface; and a rotation direction detector for determining a rotation direction of a user input to the panel surface to be clockwise or counterclockwise based on the coordinate data received by the pointing device.

In one embodiment of the invention, the jog dial emulation input device further includes a direction indicator for converting the rotation direction determined by the rotation direction detector to signals indicating a direction in which a bidirectional parameter is varied.

In another embodiment of the invention, the jog dial emulation input device further includes a direction indicator for moving a cursor in a direction according to the rotation direction determined by the rotation direction detector.

In still another embodiment of the invention, the jog dial emulation input device further includes a rotation direction display for displaying the rotation direction determined by the rotation direction detector.

In still another embodiment of the invention, the jog dial emulation input device further includes a rotation direction sound generator for generating sound indicating the rotation direction determined by the rotation direction detector.

In still another embodiment of the invention, a first location and a second location are received by the pointing device. When a distance between the first location and the second location is less than a predetermined distance, the determination of the rotation direction is not performed.

In still another embodiment of the invention, the jog dial emulation input device further includes a response parameter updator for altering the predetermined distance.

In still another embodiment of the invention, the jog dial emulation input device further includes: a mouse emulator for performing mouse inputs based on a relative change from a first location to a second location, the first and second locations being received by the pointing device; an input device for receiving an input signal; and input mode switch for switching between the mouse input mode and an input mode based on the rotation direction detector according to the input signal.

In still another embodiment of the invention, the pointing device receives a first location, a second location, and a third location. The rotation direction detector determines a rotation direction to be clockwise or counterclockwise based on a gradient of a straight line defined by the first location and the second location and a gradient of a straight line defined by the second location and the third location.

Due to such a configuration, a jog dial input mode can be emulated by making substantially circular strokes on an ordinary pointing device. The rotation direction detector may be provided as a software or a hardware associated with the pointing device, or as a device driver of the computer to which the pointing device is connected. When the rotation direction detector is provided with the pointing device the determined rotation direction can be sent to the computer as jog dial pulses. In such a case, the computer can process the input data by using the device driver of the jog dial input device.

Moreover, due to such a configuration, a mouse operation of drawing a straight line or the like can be emulated by making circular strokes on an ordinary pointing device. This allows the user to give a long-stroke command within a small operation area. A jog dial pulse includes the direction and the distance of a move. An ordinary mouse sands such a pulse for each of the X- and Y-coordinates. Based on these pulses, the device driver moves the position of the cursor (e.g., on the display screen). Therefore, if a direction indicator provided with the pointing device sends signals representing the direction in which a parameter is varied as these pulses, the input process can be performed using the device driver of the mouse. When the signals indicating the direction in which a parameter is varied are assigned to, for example, key codes of the arrow keys on the keyboard and inserted in the key buffer, the arrow keys can also be emulated. The direction indicator may be capable of moving the cursor position. The direction indicator can thus control the cursor position in place of the device driver of the mouse. The direction indicator may be provided integrally with the rotation direction detector, separately with the pointing device, or as the device driver of the computer.

Furthermore, due to such a configuration, the user can appropriately make circular strokes while checking the rotation direction indicated on the display screen.

Furthermore, due to such a configuration, the user can appropriately make circular strokes while hearing a sound generated by a sound generator such as a loud speaker or a buzzer.

Furthermore, due to such a configuration, the minimum distance of the locations input from the pointing device to be a linear segment can be altered. This allows the response parameter for inputs of the circular strokes to be adjusted. The adjustment of the response parameter may be made by pressing an assigned key and inputting the value or through other specially-assigned operations (e.g., open a dialog box on a display screen and increase/decrease a parameter in the dialog box) either in the jog dial input mode or in the mouse input mode.

Furthermore, due to such a configuration, where a input device (e.g., the keyboard) is employed, the jog dial input mode and the mouse input mode can be easily switched therebetween. For example, the operation of switching between the input modes can be such that: the jog dial input mode is selected only while an assigned key is held down; one of the input modes can be selected by pressing one assigned key so that the input mode remains selected even after the key is released; the input modes can be toggled therebetween by pressing the assigned key; or the input modes can be switched there between by a certain operation through an input device other than the keyboard.

Furthermore, due to such a configuration, the rotation direction detector can determine the rotation direction with simple calculations using the gradients of linear segments of the track of the input locations. Therefore, the real-time operation can be easily ensured. The gradients of linear segments can be easily obtained by divisions, thereby eliminating the need for the complicated angular calculation as in the gesture recognition. The rotation direction can be generally determined to be clockwise when the gradient of the linear segment decreases. Only when the sign of the gradient shifts from negative to positive, does the gradient increase with the rotation direction being clockwise. Therefore, the rotation direction can be determined easily in those exceptional cases where the gradients are discriminated before comparisons.

As described above, by using the jog dial emulation-input device of the present invention, jog dial input operations can be emulated by making circular strokes on an ordinary pointing device. By using the jog dial emulation-input device of the present invention, a stroke input as in a stroke device or the like can be performed in a jog-dial-like manner. Therefore, a longstroke input can be easily made within a small operation area without requiring any special jog dial input device. In the jog dial emulation input device of the present invention, the rotation direction can be detected by simply calculating and comparing gradients, thereby reducing the load on the processing unit. Thus, real-time operations can be ensured.

According to another jog dial emulation input device of the present invention, the user can ensure appropriate operation of making circular strokes by perceiving the display or sound from an indicator, thereby affording the user an easy and accurate input operation.

According to still another jog dial emulation input device of the present invention, the response parameter for inputs of the circular strokes can be altered easily. Therefore, the user can select the most suitable response parameter according to his preference or to the operation to be performed.

According to still another jog dial emulation input device of the present invention, the jog dial input mode and the mouse input mode can be switched easily therebetween. Therefore, space and cost can be saved as compared to the case where two different input devices are installed.

Thus, the invention described herein makes possible the advantage of providing a jog dial emulation input device for giving a command for moving the cursor or increasing/decreasing a value by making circular strokes on a touch-panel type mouse pad or the like.

This and other advantages of the present invention will become apparent to those skilled in the art upon reading and understanding the following detailed description with reference to the accompanying figures.

DESCRIPTION OF THE PREFERRED EMBODIMENTS

EXAMPLE 1

Hereinafter, Example 1 of the present invention will be described with reference to FIGS. 1 and 2.

Figure 1:
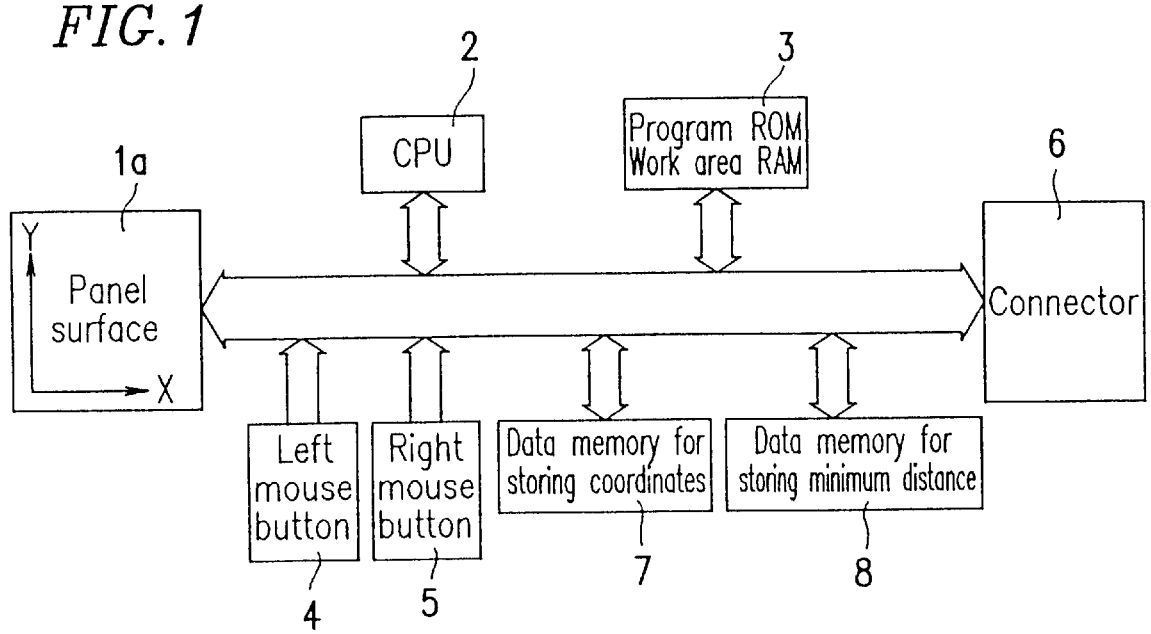
FIG. 1 shows a jog dial emulation input device according to Example 1 of the present invention.

FIG. 1 is a block diagram showing a configuration of a jog dial emulation input device according to Example 1 of the present invention. FIG. 2 is a plan view showing a mouse pad 1 of Example 1.

Figure 2:
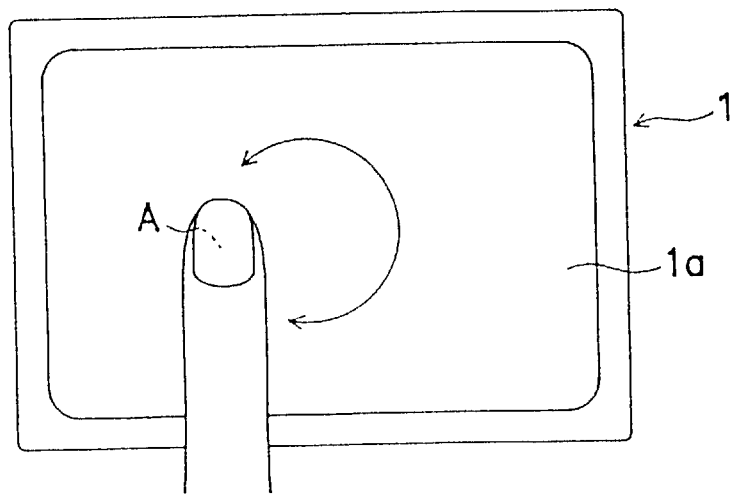
FIG. 2 is a plan view showing a mouse pad of the jog dial emulation input device according to Example 1 of the present invention.

In Example 1, the mouse pad 1 as shown in FIG. 2 is employed as a pointing device. The mouse pad 1 includes a touch panel surface 1a having a rectangular shape with a long side being about 5 cm long. The mouse pad 1 detects the location of a finger tip A of the user on the panel surface 1a. The mouse pad 1 is thus capable of emulating an ordinary mouse.

The mouse pad 1 is provided with right and left mouse buttons (not shown). A device such as the mouse pad 1 has been developed as a substitute pointing device for an ordinary mouse, and is generally called "touch mouse", "touch pad", "stylus pad", "stylus mouse" or "glide point". In the present invention, other pointing devices such as an ordinary mouse or a stylus pen may also be used in place of the mouse pad 1.

FIG. 1 shows a jog dial emulation input device including the mouse pad panel surface 1a and CPU 2.

CPU 2 is capable of performing the following processes based on a program stored in a ROM (Read-Only Memory) in a memory 3. CPU 2 is capable of obtaining the coordinates of the location of the finger tip A on the panel surface 1a and determining whether or not the left or right mouse button 4 or 5 is pressed down. CPU 2 is thus capable of processing the input coordinates as mouse inputs (hereinafter, this process is referred to as the "mouse process"). CPU 2 is also capable of outputting through a connector 6 the coordinates of the mouse location and a signal indicating whether the left or right mouse button 4 or 5 is pressed down.

CPU 2 stores coordinates of three locations of the finger tip A detected successively in time (hereinafter, referred to as the "second previous to last", the "first previous to last", and the "last" locations) in a coordinate memory 7. Using work area of a RAM (Random Access Memory) in the memory 3, CPU 2 refers to the coordinates of the second previous to last, the first previous to last, and the last locations, and a minimum distance $L_{min}$ stored in a minimum distance memory 8. Based on these values, CPU 2 determines the rotation direction of the trace of these locations to be clockwise or counterclockwise. CPU 2 is thus capable of processing the input coordinates as jog dial inputs (hereinafter, this process is referred to as the "jog dial process"). Moreover, CPU 2 is capable of outputting the rotation direction through the connector 6. The program is also capable of updating the design value of the minimum distance $L_{min}$ stored in the minimum distance memory 8 by altering the minimum distance $L_{min}$ to a value most recently sent through the connector 6.

Figure 3:
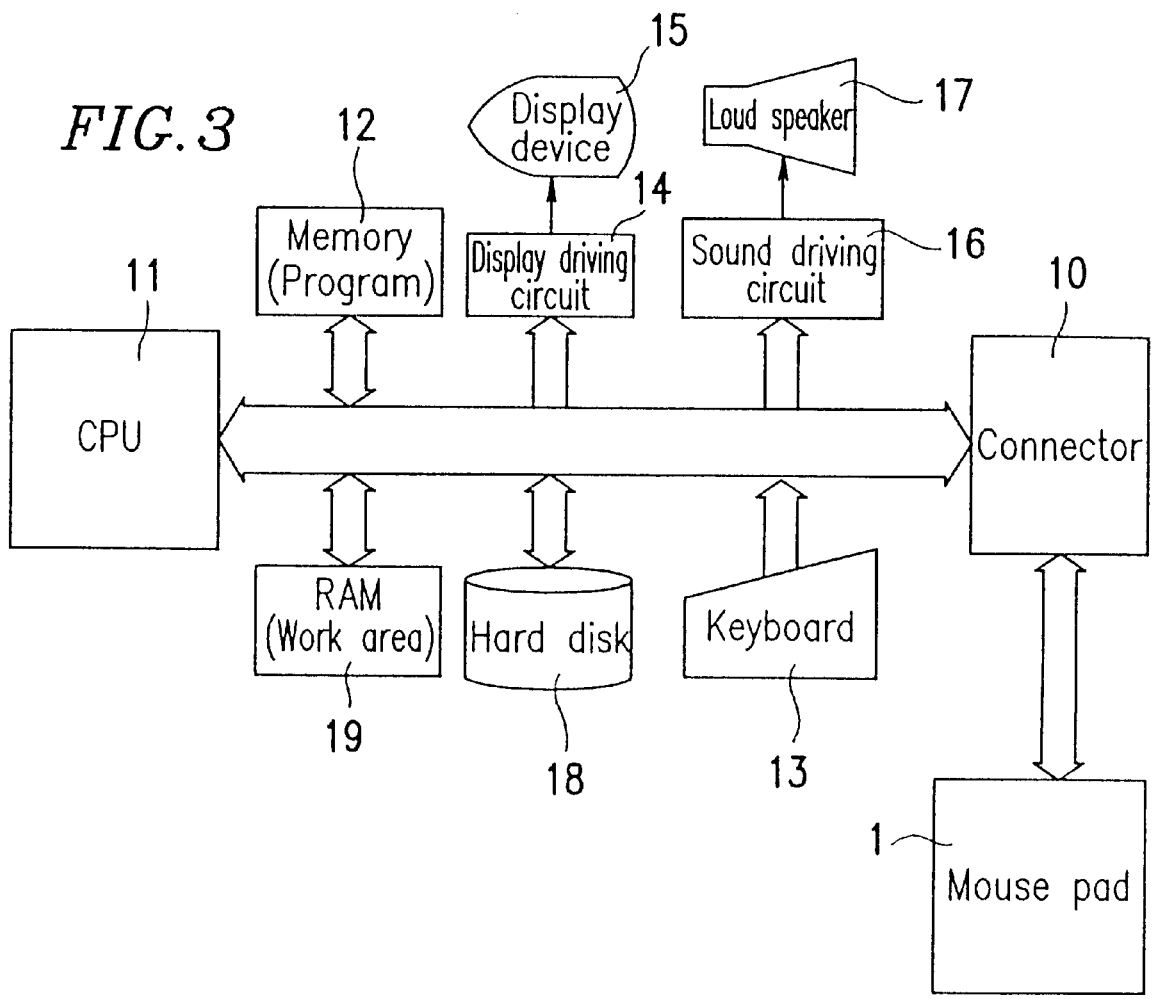
FIG. 3 is a block diagram showing the jog dial emulation input device of Example 1 and a computer to which the mouse pad is connected.

FIG. 3 shows the jog dial emulation input device and the computer.

The mouse pad 1 is connected to a connector 10 of the computer via the connector 6 (FIG. 1). The mouse pad 1 is used as an input device of the computer.

CPU 11 of the computer executes a system program stored in a memory 12 including a RAM and a ROM. CPU 11 is capable of performing the following processes by using a device driver of the system program.

CPU 11 receives from the mouse pad 1 via the connector 10, coordinate data, date indicating whether the left or right mouse button 4 or 5 is pressed down, and the determined rotation direction.

CPU 11 sends the design value of the minimum distance $L_{min}$ to the mouse pad 1 via the connector 10.

CPU 11 accepts key inputs from a keyboard 13, and performs a display function on a display device 15 by employing a display driving circuit 14.

CPU 11 generates a sound through a loud speaker 17 by using a sound driving circuit 16. A buzzer may be used in place of the loud speaker 17.

CPU 11 reads out an application program from a hard disk 18, stores it in the memory 12, and executes it automatically as requested by the system program, or on a command input from keyboard 13 or the mouse pad 1. CPU 11 is capable of performing the following processes by using the application program.

CPU 11 further executes the device driver to process input data from the mouse pad 1 and the keyboard 13.

CPU 11 further executes the device driver to perform display on the display device 15.

CPU 11 further executes the device driver to generate a sound through the loud speaker 17. The RAM 19 is used as work area for the system program and the application program As described above, the mouse pad 1 is capable of sending the determined rotation direction of jog dial inputs to the computer as well as coordinate data of mouse inputs. It is also applicable that the mouse pad 1 outputs coordinate data and the computer performs the jog dial process. The computer determines the rotation direction using a device driver.

The operations of the computer and the mouse pad 1 shown in FIG. 3 which performs the jog dial process will be described with reference to flow charts shown in FIGS. 4 to 7. Referring to these flow charts, the operations of the device driver and the application program of the computer will now be described along with the operations of the program of the mouse pad 1. In these flow charts, it is assumed that the same variable stores a value of the same kind.

At step S1, the location of the finger tip A of the user on the panel surface 1a is determined as the coordinates. Step 1 includes steps S21 and S22 shown in FIG. 5.

At step S21, CPU 2 sets variable X to the X-coordinate value of the location of the finger tip A on the panel surface 1a. At step S22, CPU 2 sets variable Y to the Y-coordinate value of the location of the finger tip A on the panel surface 1a.

At step 82, CPU 2 sets variables $X_1$ and $Y_1$ to the values of variables X and Y, respectively. Variables $X_1$ and $Y_1$ stored in the coordinate memory 7 hold the coordinates of the previous location.

At step S3, CPU 2 initializes variable N to "0".

At step S4, CPU 2 sets the minimum distance $L_{min}$ in the minimum distance memory 8 to a predetermined value.

In the present example, the initialization process of steps S1 to S3 is performed by CPU 2 of the mouse pad 1. The initialization process may also be performed by CPU 11 executing the application program when jog dial inputs are required by the computer. Alternatively, CPU 2 may regularly sample the coordinates of the position of the finger tip A from the panel surface 1a. It is also applicable that CPU 2 samples the coordinates of the position of the finger tip A when the finger tip A is detected on the panel surface 1a.

At step S5, after the above-described initialization process, the jog dial process is performed. CPU 2 determines variable G indicating the rotation direction of the circular strokes of the finger tip A on the panel surface 1a, and also determines variable D indicating whether the rotation direction is determinable.

Variable G is set to "1", when the rotation direction of the circular strokes of the finger tip A on the panel surface 1a is clockwise, and to "0" when the direction is counterclockwise. Variable D is set to "1" when the rotation direction is determinable, and to "0" when it is not determinable. The jog dial process will be described more in detail below with reference to FIGS. 6 and 7.

CPU 11 of the computer can directly refer to variables G and D determined by CPU 2 of the mouse pad 1, with the memory storing these variables being shared by the jog dial emulation input device and the computer. In particular, CPU 11 of the computer receives variables G and D via the connector 10, or CPU 11 issues a system call or accepts an event.

At step S6, after variables G and D are determined in the jog dial process, CPU 2 checks variable D. CPU 2 proceeds to step S7 if variable D is "1", and CPU 2 proceeds to step S10 if variable D is not "1".

At step S7, CPU 2 checks variable G. CPU 2 proceeds to step S8 if variable G is "1", and CPU 2 proceeds to step S8 if variable G is not "1".

At step S8, since the rotation direction has been determined to be clockwise, CPU 2 or 11 performs processes for the case where the rotation direction of the jog dial inputs is clockwise.

At step S9, since the rotation direction has been determined to be counterclockwise, CPU 2 or 11 performs processes for the case where the rotation direction of the jog dial inputs is counterclockwise.

At step S10, CPU 2 or 11 performs processes for the case where there is no jog dial input.

After any one of steps S8 to S10, CPU 2 returns to step S5 for the jog dial process and repeats these steps as described above.

Figure 4:
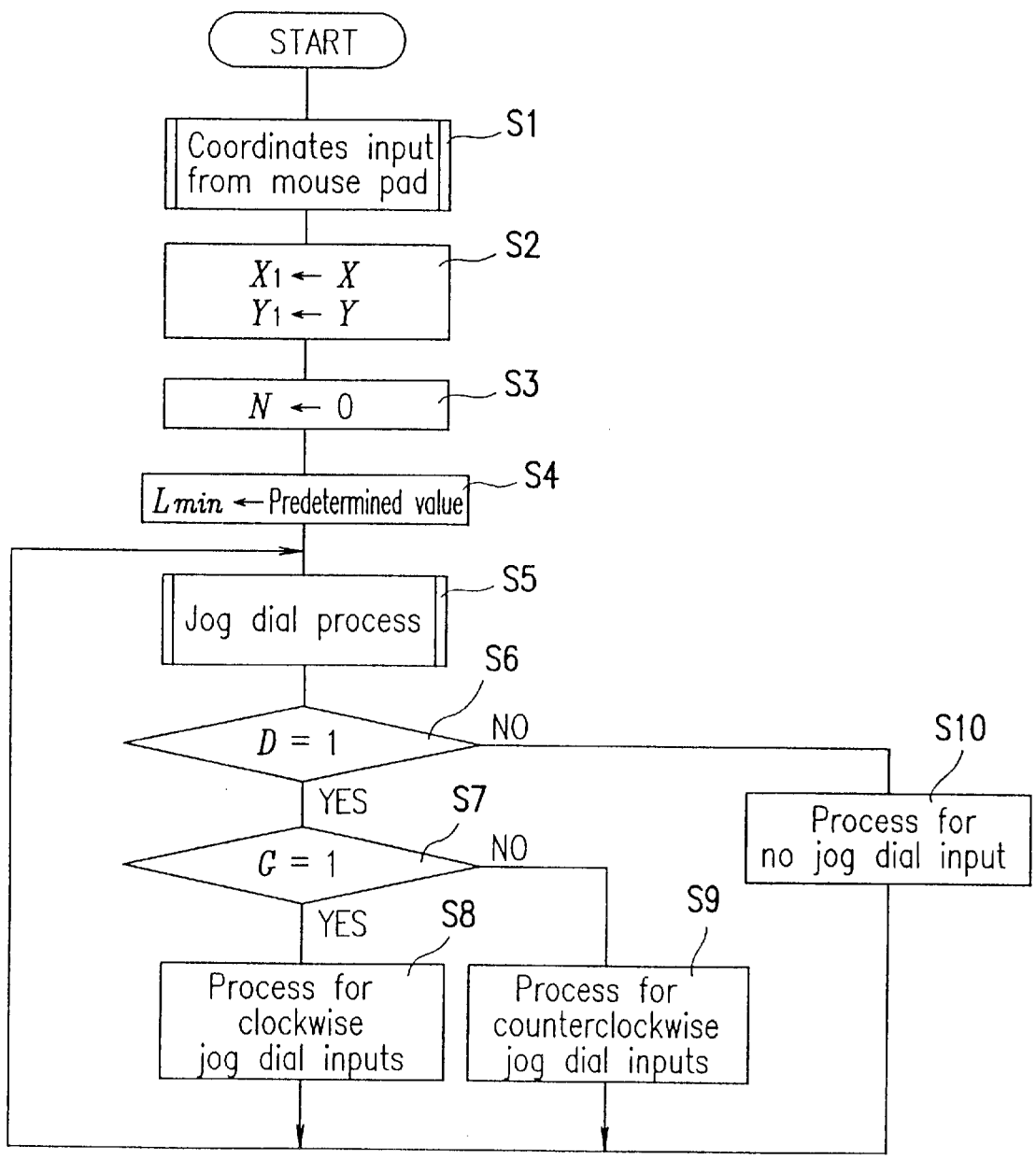
FIG. 4 is a flow chart of Example 1 of the present invention illustrating the processes performed for inputs from the mouse pad.
Figure 5:
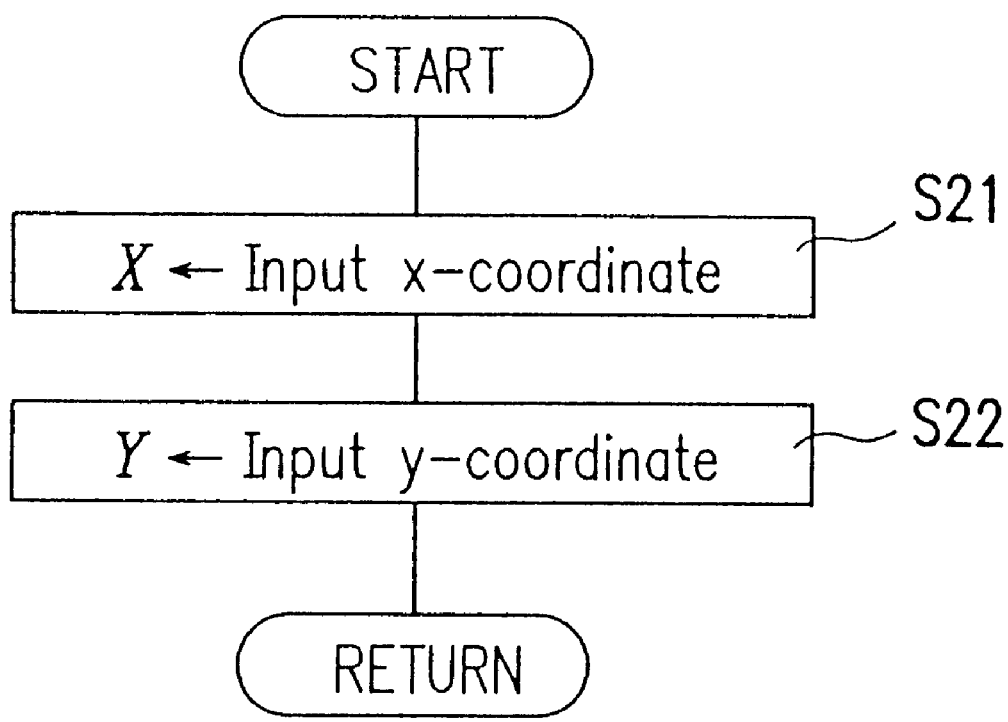
FIG. 5 is a flow chart of Example 1 of the present invention illustrating the process for obtaining coordinates of locations on the mouse pad.

Usually, the processes of steps S6 to S10 are performed by CPU 2 or 11 executing the application program. For example, when the user is selecting an article from the menu list, the cursor is moved up/down from one article to the next by the process of step S8 or S9. When jog dial inputs are no longer required, the processes shown in FIG. 4 are terminated.

Figure 6:
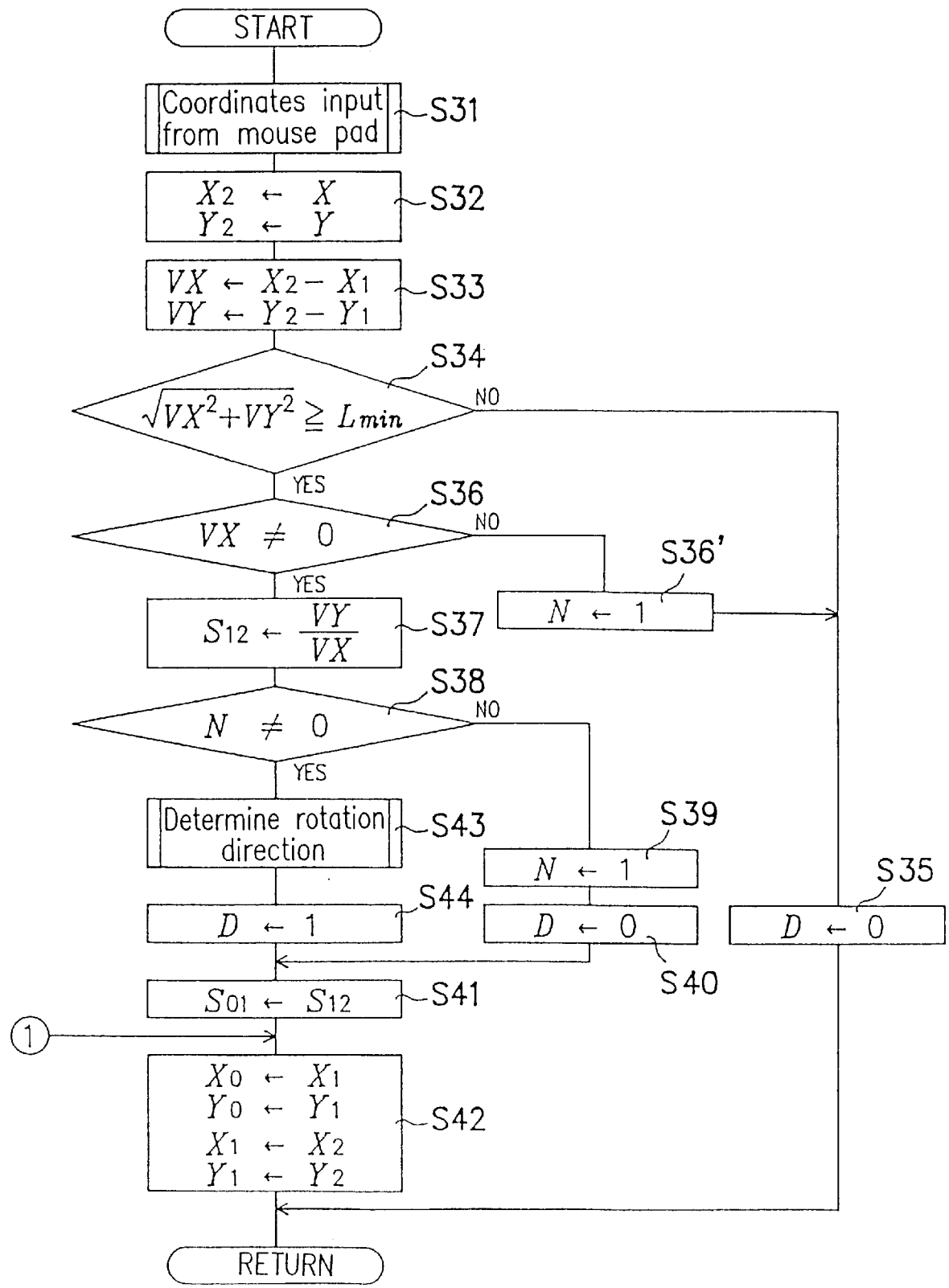
FIG. 6 is a flow chart of Example 1 of the present invention illustrating the jog dial process for inputs from the mouse pad.

Hereinafter, step S5 for the jog dial process will be described with reference to FIG. 6.

At step S31, CPU 2 reads the coordinates from the panel surface 1a. It is also applicable that CPU 2 constantly performs these processes and CPU 11 refers to variables G and D when needed. This process of reading the coordinates is the same as step S1 in FIG. 5.

At step S32, CPU 2 sets variables $X_2$ and $Y_2$ to the values of variables X and Y, respectively, obtained at step S31. Variables $X_2$ and $Y_2$ stored in the coordinate memory 7 hold the coordinates of the last location.

At step S33, CPU 2 calculates the difference $(X_2-X_1)$ between the X-coordinates of the previous coordinates and the last coordinates. Variable VX is set to the obtained difference. CPU 2 also calculates the difference $(Y_2-Y_1)$ between the Y-coordinates of the previous coordinates and the last coordinates. Variable VY is set to the obtained difference.

At step S34, CPU 2 calculates the distance between the previous location and the last location based on variables VX and VY. CPU 2 compares the calculated distance with the minimum distance $L_{min}$ stored in the minimum distance memory 8. If the distance is equal to or greater than the minimum distance $L_{min}$, in CPU 2 proceeds to step S36. If the distance is less then the minimum distance $L_{min}$, CPU 2 proceeds to step S35.

At step S35, CPU 2 sets variable D to "0" (indicating "not determinable") and terminates the jog dial process. The circular stroke (i.e., the track of the moving locations) on the panel surface 1a is recognized as successive linear segments. The rotation direction is determined by comparing two successive segments. However, when the distance between the previous location and the last location is less than the minimum distance $L_{min}$, the move made by the finger tip A is regarded as insufficient for the determination of the rotation direction, thereby cancelling the input coordinates. Therefore, the number of times the rotation direction is determined differs according to the predetermined minimum distance $L_{min}$ even when the same circular strokes are made by the user. Thus, the minimum distance $L_{min}$ determines the response parameter of the jog dial input device.

At step S36, CPU 2 compares variable VX with "0". This step S36 is for avoiding a divide-by-zero error at the subsequent step S37.

At step S37, CPU 2 calculates the gradient (VY/VX) of the linear segment and sets variable $S_{12}$ to the obtained gradient. Variable $S_{12}$ thus represents the gradient of the last linear segment (defined by the previous location and the last location).

At step S36', CPU 2 sets variable N to "1" indicating that the rotation direction is determinable in the next jog dial process. Then, CPU 2 proceeds to the above-described step S35.

At step S38, CPU 2 compares variable N with "0". If variable N is "0", CPU 2 proceeds to step S39. If variable N is not "0", CPU 2 proceeds to step S43.

At step S39, CPU 2 sets variable N to "1".

At step S40, CPU 2 sets variable D to "0" (indicating "not determinable").

At step S41, CPU 2 sets variable $S_{01}$ to the value of variable $S_{12}$.

At step S42, CPU 2 sets variables $X_0$, $Y_0$, $X_1$ and $Y_1$ to the values of variables $X_1$, $Y_1$, $X_2$ and $Y_2$, respectively. Since variable N is initialized at step S3, variable N is "0" when step S5 is first called. Variable N being "1" indicates that two or more valid moves have been made so that the rotation direction is determinable. Variable $S_{01}$ is for holding the gradient of the previous to last linear segment. Variables $X_0$ and $Y_0$ stored in the coordinate memory 7 hold the coordinates of the second previous to last location. Steps S41 and S42 are preparation process for the next call.

In any subsequent call, when variable N is determined to be not "0" at step S36, CPU 2 proceeds to step S43.

At step S43, the rotation direction is determined. As will be described more in detail below with reference to FIG. 7, in this process of determining the rotation direction, the value of variable G indicating the rotation direction is usually determined.

At step S44, CPU 2 sets variable D to "1" (indicating that the rotation direction has been determined). Then, CPU 2 proceeds to step S41 and then to step S42, thus terminating the jog dial process and returning to step S6 in FIG. 4.

Figure 7:
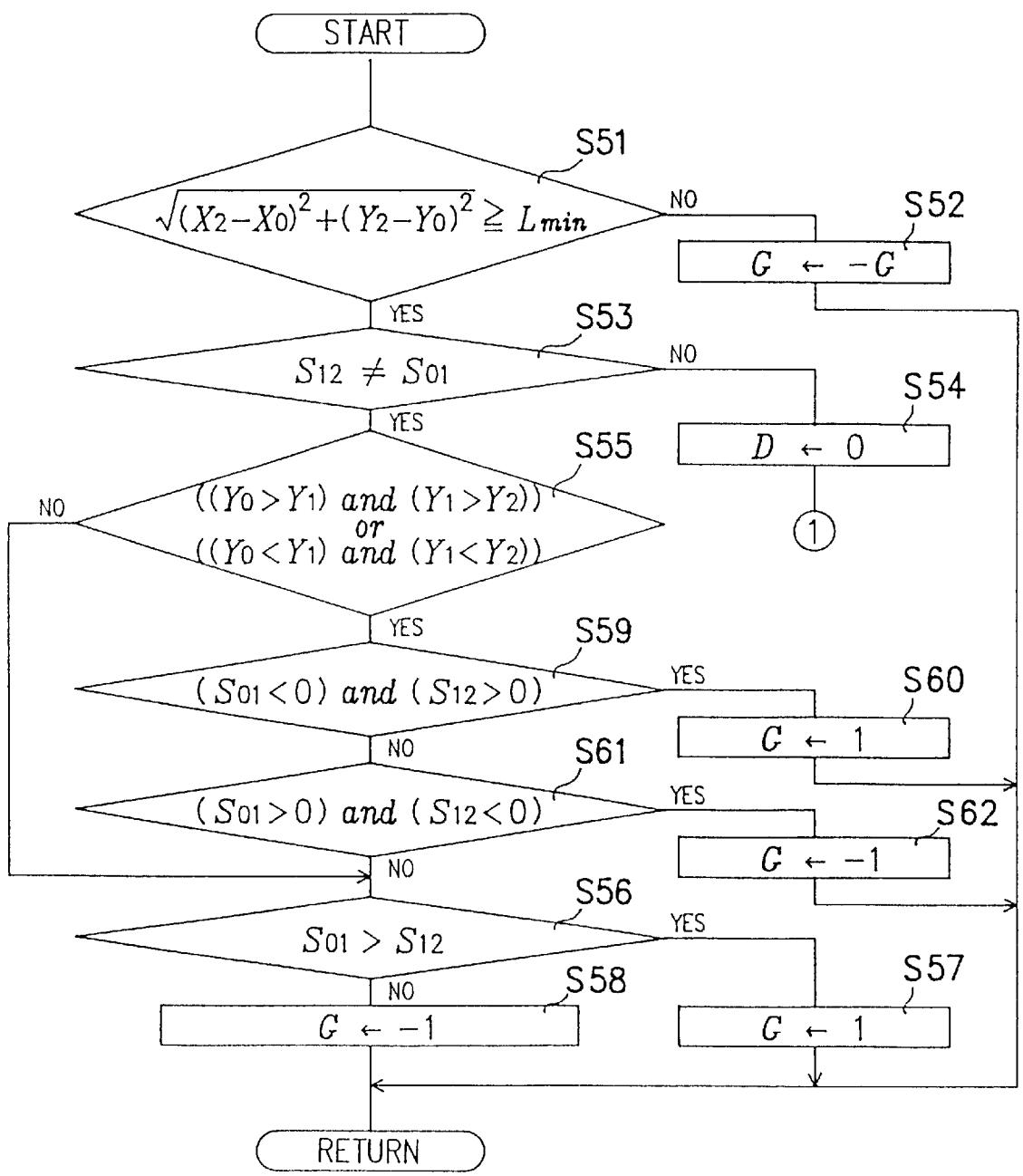
FIG. 7 is a flow chart of Example 1 of the present invention illustrating the process for determining the rotation direction of the inputs from the mouse pad.

Hereinafter, step S43 for determining the rotation direction will be described more in detail with reference to FIG. 7.

At step S51, CPU 2 first calculates the distance between the second previous to last location ($X_0$, $Y_0$) and the last location ($X_2$, $Y_2$), and compares the distance with the minimum distance $L_{min}$. If the distance is less than the minimum distance $L_{min}$, CPU 2 proceeds to step S53. If the distance is not less than the minimum distance $L_{min}$, CPU 2 proceeds to step S52.

At step S52, CPU 2 inverts the sign of the value of variable G and terminates the process of determining the rotation direction. The sign of variable G holding the last rotation direction is inverted for the reason below.

Figure 8:
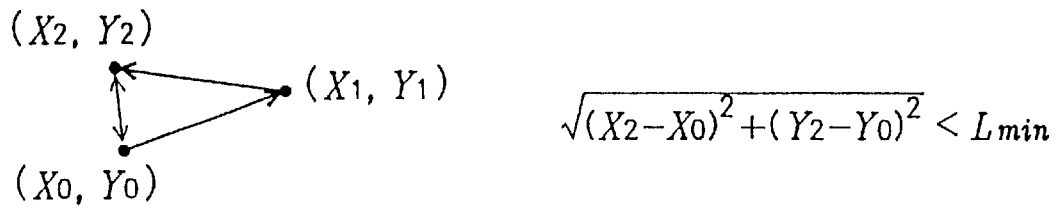
FIG. 8 is a diagram of Example 1 of the present invention illustrating a case where a user suddenly inverts the rotation direction.

FIG. 8 shows the track of input locations in the case where the user making a circular stroke in a certain rotation direction suddenly inverts the rotation direction. As shown in FIG. 8, the finger tip A of the user once moves away from the second previous to last location ($X_0$, $Y_0$) to the first previous to last location ($X_1$, $Y_1$) but then moves to the last location ($X_2$, $Y_2$) which is closer to the second previous to last location ($X_O$, $Y_O$). When the second previous to last location and the last location are so close together that the distance therebetween is less than the minimum distance $L_{min}$, these moves can be regarded as a sudden inversion of the rotation direction.

Since the sudden direction inversion can be detected also in the next jog dial process, step S51 is not necessary. However, step S51 allows CPU 2 to detect more quickly the sudden direction inversion, thereby improving the response rate of the jog dial emulation input device. Although not shown in FIG. 7, the detection of the sudden direction inversion must be rendered inactive until variable G is first set.

It is also applicable to store the square value of the minimum distance $L_{min}$. In such a case, the square root calculation at step S51 and/or S34 can be omitted.

The detection of the sudden direction inversion at step S51 does not necessarily have to employ the minimum distance $L_{min}$ used in step S34, but may also employ any other appropriate values.

At step S53, CPU 2 compares variable $S_{12}$ with variable $S_{01}$. If variable $S_{12}$ is equal to $S_{01}$, CPU 2 proceeds to step S54. If variable $S_{12}$ is not equal to $S_{01}$, CPU 2 proceeds to step S55.

At step S54, CPU 2 sets variable D to "0" (indicating "not determinable") because the previous and the last linear segments are aligned in line and, therefore, the rotation direction cannot be determined. Then, CPU 2 proceeds to step S42 in FIG. 6. Herein, the jog dial process may be terminated while skipping step S42.

At step S55, CPU 2 determines whether the Y-coordinate monotonously increases/decreases from the second previous to last location to the last location via the first previous to last location. If the Y-coordinate monotonously increases/decreases, CPU 2 proceeds to step S59. If the Y-coordinate does not monotonously increase/decrease, CPU 2 proceeds to step S56.

Figure 9:
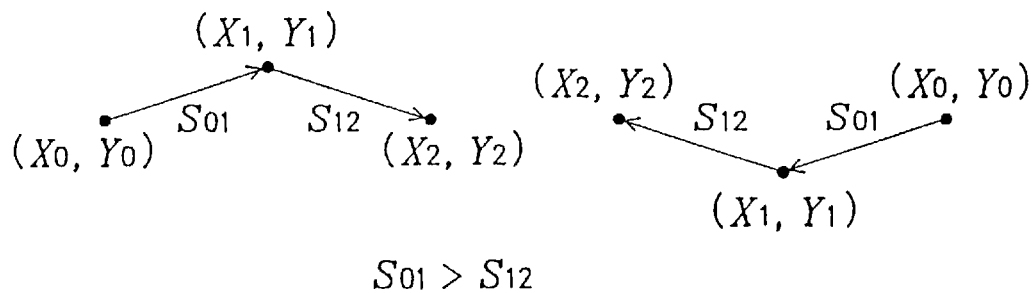
FIG. 9 is a diagram for Example 1 of the present invention illustrating cases where the rotation direction is clockwise.
Figure 10:
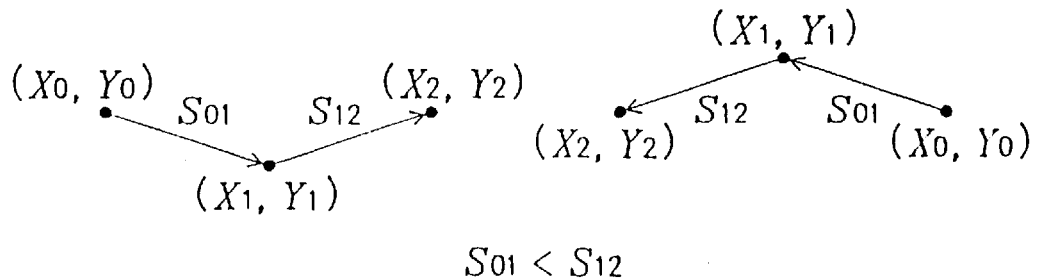
FIG. 10 is a diagram for Example 1 of the present invention illustrating cases where the rotation direction is counterclockwise.

FIGS. 9 and 10 show cases where the Y-coordinate does not monotonously increase/decrease. In both of the two cases shown in FIG. 9, variable $S_{12}$ is smaller than $S_{01}$ and, therefore, the rotation direction is determined to be clockwise. On the other hand, in both of the two cases shown in FIG. 10, variable $S_{12}$ is greater than $S_{01}$ and, therefore, the rotation direction is determined to be counterclockwise. Throughout the figures (including FIGS. 9 and 10), the X-coordinate increases toward the right in the figure, and the Y-coordinate increases upward in the figure.

At step S56, CPU 2 compares variable $S_{12}$ with variable $S_{01}$. If variable $S_{12}$ indicating the gradient of the last linear segment is smaller than variable $S_{01}$, CPU 2 proceeds to step S57. If variable $S_{12}$ indicating the gradient of the last linear segment is greater than variable $S_{01}$, CPU 2 proceeds to step S58.

At step S57, CPU 2 sets variable G to "1" (indicating "clockwise rotation") and terminates the process of determining the rotation direction.

At step S58, CPU 2 sets variable G to "−1" (indicating "counterclockwise rotation") and terminates the process of determining the rotation direction.

As described above, if the Y-coordinate is determined to monotonously increase/decrease at step S55, CPU 2 proceeds to step S59.

At step S59, CPU 2 detects the case where variable $S_{01}$ is negative and variable $S_{12}$ is positive. If variable $S_{01}$ is negative and variable $S_{12}$ is positive, CPU 2 proceeds to step S60. If variable $S_{01}$ is not negative or variable $S_{12}$ is not positive, CPU 2 proceeds to step S61.

Figure 11:
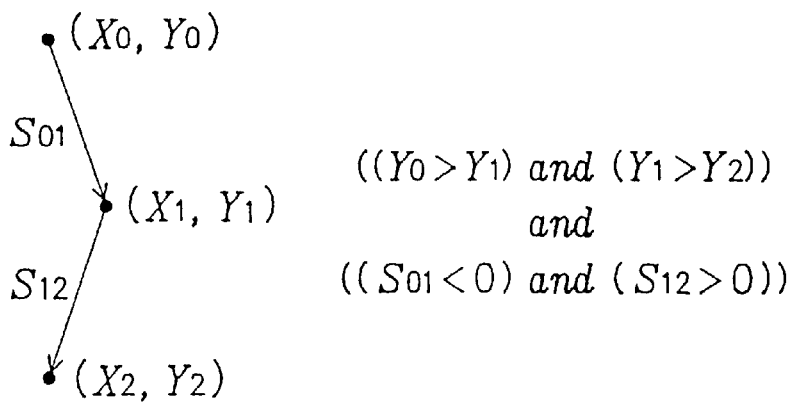
FIG. 11 is a diagram for Example 1 of the present invention illustrating cases where the rotation direction is clockwise.
Figure 12:
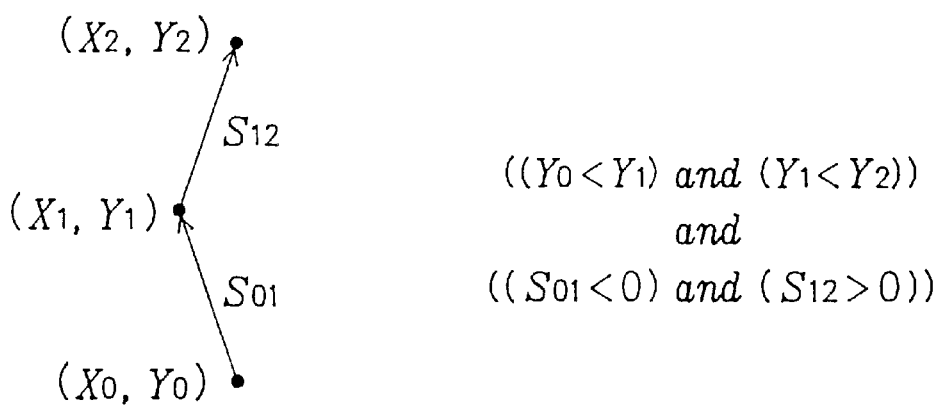
FIG. 12 is a diagram for Example 1 of the present invention illustrating cases where the rotation direction is clockwise.

At step S60, CPU 2 sets variable G to "1" (indicating "clockwise rotation") and terminates the process of determining the rotation direction. FIG. 11 shows a case where the Y-coordinate monotonously decreases; and FIG. 12 shows a case where the Y-coordinate monotonously increases. In both cases, the rotation direction is determined to be clockwise.

At step S51, CPU 2 detects the case where variable $S_{01}$ is positive and variable $S_{12}$ is negative. If variable $S_{01}$ is positive and variable $S_{12}$ is negative, CPU 2 proceeds to step S62. If variable $S_{01}$ is not positive or variable $S_{12}$ is not negative, CPU 2 proceeds to step S56 described above.

Figure 13:
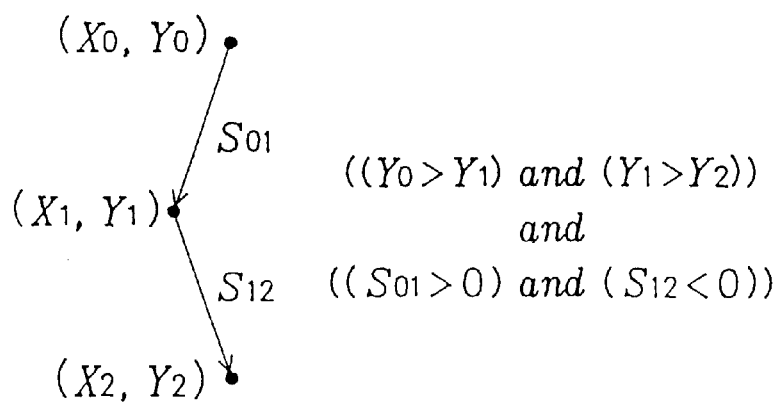
FIG. 13 is a diagram for Example 1 of the present invention illustrating cases where the rotation direction is counterclockwise.
Figure 14:
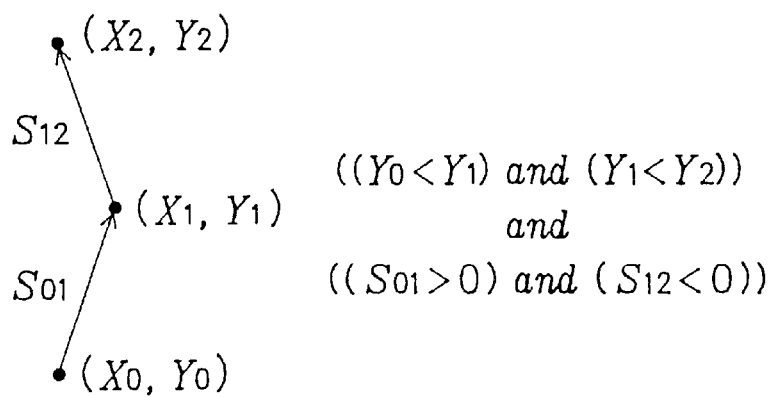
FIG. 14 is a diagram for Example 1 of the present invention illustrating cases where the rotation direction is counterclockwise.

At step S62, CPU 2 sets variable G to "−1" (indicating "counterclockwise rotation") and terminates the process of determining the rotation direction. FIG. 13 shows a case where the gradient monotonously decreases; and FIG. 14 shows a case where the gradient monotonously increases. In both cases, the rotation direction is determined to be counterclockwise.

If the signs of variables $S_{01}$ and $S_{12}$ are the same, CPU 2 proceeds to step S59, step S61 and then to Step S56 described above. The rotation direction is thus determined based on the comparison between variables $S_{12}$ and $S_{01}$. When the values of variables $S_{12}$ and $S_{01}$ are both negative, the one having a smaller absolute value (i.e., a smaller gradient) is regarded to be of a greater value.

Figure 15:
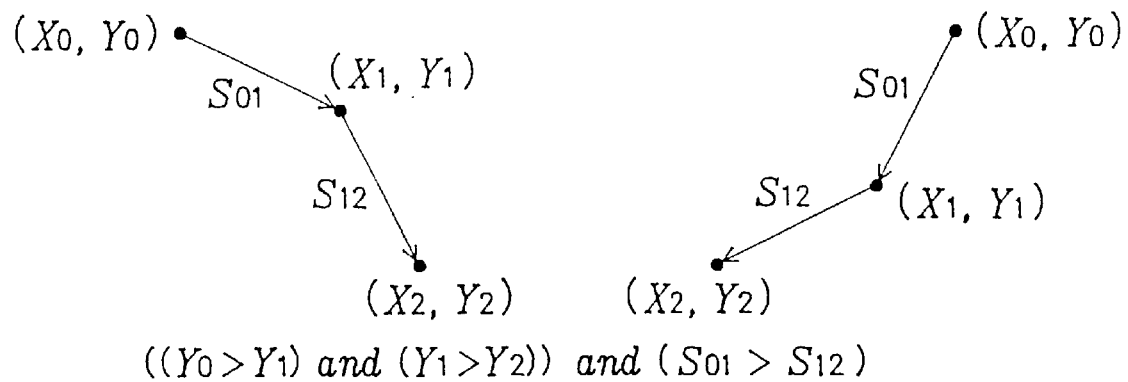
FIG. 15 is a diagram for Example 1 of the present invention illustrating cases where the rotation direction is clockwise.
Figure 16:
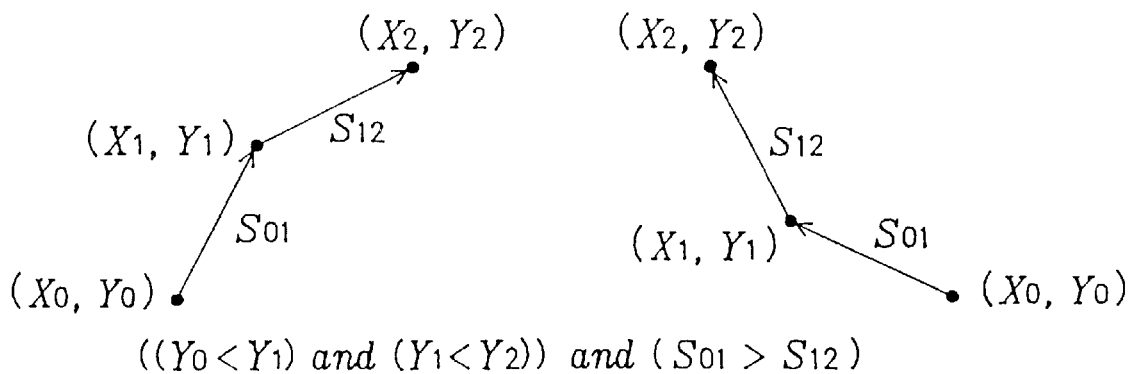
FIG. 16 is a diagram for Example 1 of the present invention illustrating cases where the rotation direction is clockwise.

FIG. 15 shows two cases where the gradient monotonously decreases; and FIG. 16 shows two cases where the gradient monotonously increases. In both FIGS. 15 and 16, variable $S_{01}$ is greater than variable $S_{12}$ and, therefore, the rotation direction is determined to be clockwise.

Figure 17:
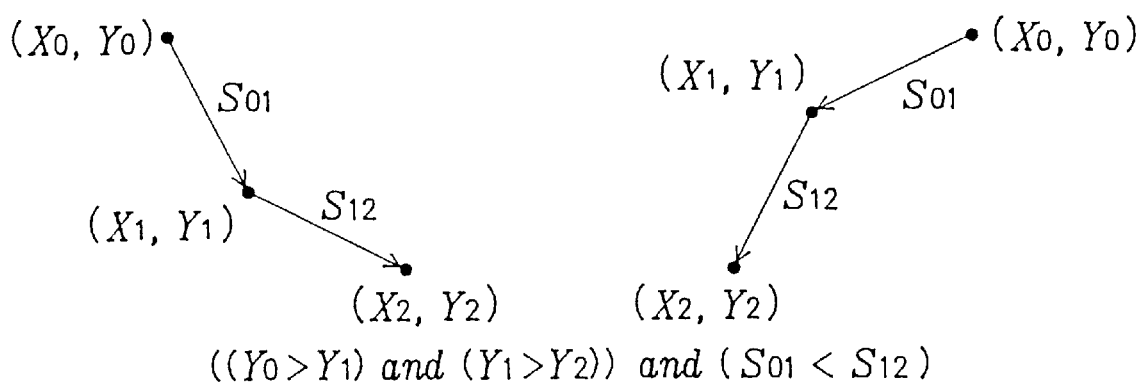
FIG. 17 is a diagram for Example 1 of the present invention illustrating cases where the rotation direction is counterclockwise.
Figure 18:
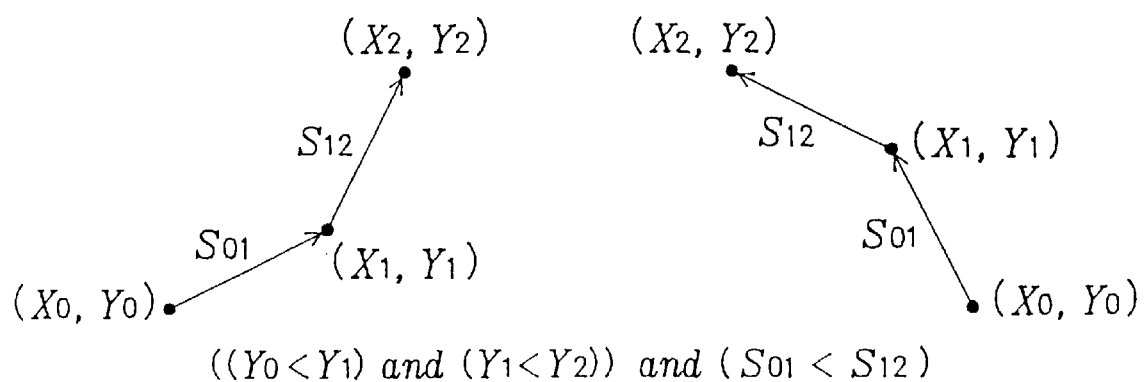
FIG. 18 is a diagram for Example 1 of the present invention illustrating cases where the rotation direction is counterclockwise.

FIG. 17 shows two cases where the gradient monotonously decreases; and FIG. 18 shows two cases where the gradient monotonously increases. In both FIGS. 17 and 18, variable $S_{12}$ is greater than variable $S_{01}$ and, therefore, the rotation direction is determined to be counterclockwise.

Principally, in steps S55 to S62 described above, the rotation direction is determined to be clockwise (at step S57) when the gradient of the linear segment decreases ($S_{01}>S_{12}$), whereas the rotation direction is determined to be counterclockwise (at step S58) when the gradient of the linear segment increases ($S_{01}<S_{12}$).

On the other hand, the cases shown in FIGS. 11 to 14 are exceptions, where the gradient monotonously increases/decreases and the signs of the gradients of the previous and the last linear segments are opposite to each others. When the sign of the gradient shifts from negative to positive ($S_{01}<0$ and $S_{12}>0$), the rotation direction is determined to be clockwise (at step S60) despite that the gradient of the linear segment increases. On the other hand, when the sign of the gradient shifts, from positive to negative ($S_{01}>0$ and $S_{12}<0$), the rotation direction is determined to be counterclockwise (at step S62) despite that the gradient of the linear segment decreases.

Hereinafter, an exemplary operation of the jog dial emulation input device of the present invention will be described.

Figure 19:
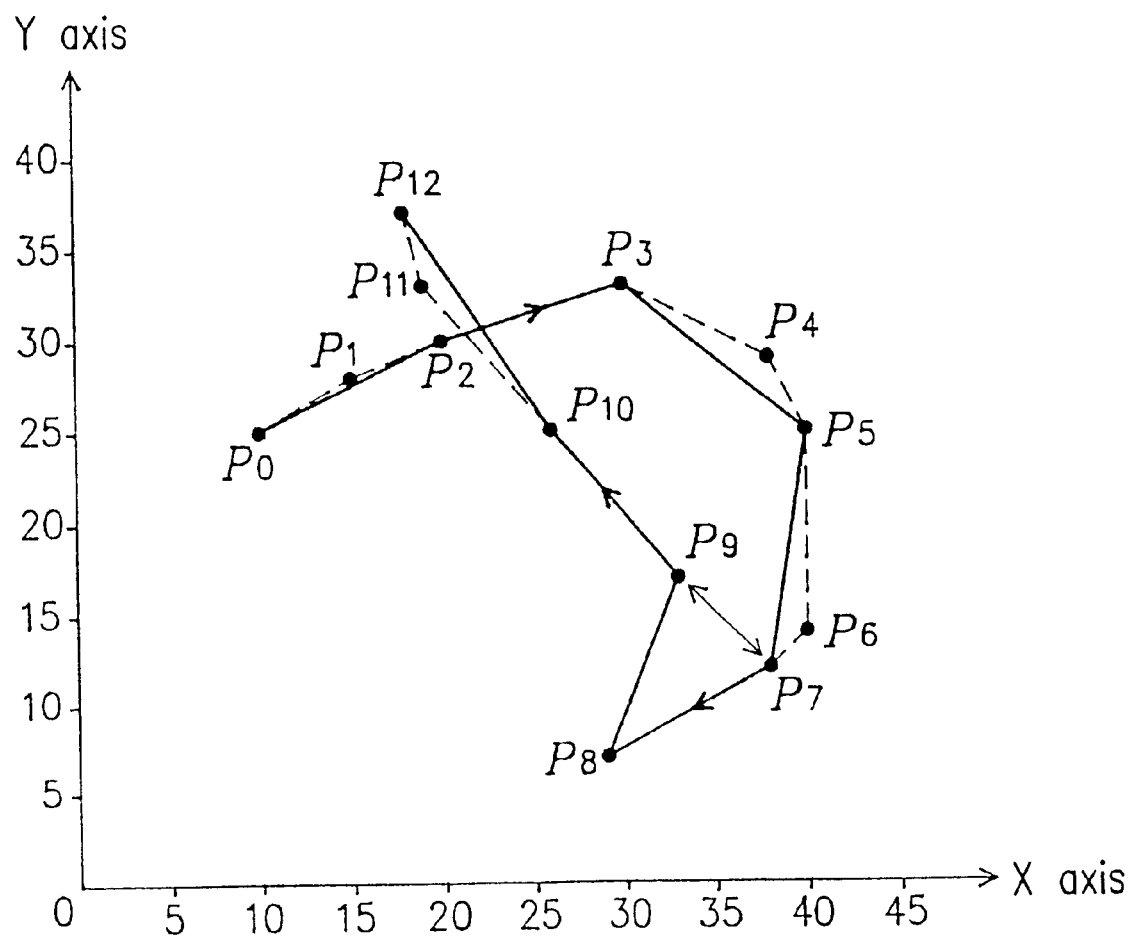
FIG. 19 is a diagram for Example 1 of the present invention illustrating the location of the successively-moving finger tip.

FIG. 19 shows a case where the finger tip A slides on the panel surface 1a from start location $P_0$ to end location $P_{12}$. Table 1 shows: the X-/Y-coordinates; the distance between the previous location and the last location calculated at step S34; the gradient of the last linear segment calculated at step S37; and the values of variables N, D and G, for each of the locations $P_0$ to $P_{12}$. Herein, the distances between locations are shown in millimeters (mm).

TABLE 1

| Loca- | Coor-dinates | | Distance from the previous location | Gradient of the last linear segment | Resultant values of variables | | |
|---|---|---|---|---|---|---|---|
| tion | X | Y | | | N | D | G |
| P0 | 10 | 25 | — | — | — | — | — |
| P1 | 15 | 28 | 5.83 | — | 0 | 0 | — |
| P2 | 20 | 30 | 11.18 | 0.50 | 1 | 0 | — |
| P3 | 30 | 33 | 10.15 | 0.30 | 1 | 1 | 1 |
| P4 | 38 | 29 | 8.94 | — | 1 | 0 | — |

TABLE 1-continued

| Loca- | Coor-dinates | | Distance from the previous location | Gradient of the last linear segment | Resultant values of variables | | |
|---|---|---|---|---|---|---|---|
| tion | X | Y | | | N | D | G |
| P5 | 40 | 25 | 12.81 | −0.80 | 1 | 1 | 1 |
| P6 | 40 | 14 | 11.00 | — | 1 | 0 | — |
| P7 | 38 | 12 | 13.15 | 6.50 | 1 | 1 | 1 |
| P5 | 29 | 7 | 10.30 | 0.56 | 1 | 1 | 1 |
| P9 | 33 | 17 | 10.77 | 2.50 | 1 | 1 | −1 |
| P10 | 26 | 25 | 10.63 | −1.14 | 1 | 1 | −1 |
| P11 | 19 | 33 | 10.63 | −1.14 | 1 | 0 | — |
| P12 | 18 | 37 | 14.42 | −1.50 | 1 | 1 | 1 |

In the present example, the minimum distance $L_{min}$ is set to be about 10 mm.

The coordinates of start location $P_0$ are input at step S1. Variable N is initialized to "0" later at step S3.

When the finger tip A moves to location $P_1$, the distance between the previous location $P_0$ to the last location $P_1$ is about 5.83 being less than the minimum distance $L_{min}$. Variable D is thus set to "0" at step S35 indicating that the rotation direction is not determinable. Then, the process of step S10 for the case where there is no jog dial input is performed.

When the finger tip A moves to location $P_2$, the distance between the second previous to last location $P_0$ to the last location $P_2$ is about 11.18 being greater then the minimum distance $L_{min}$. Thus, the gradient is calculated to be about 0.50 at step S37, and variable N is set to "1" at step S39 indicating that the rotation direction is determinable. However, since variable D is set to "0" at step S40, the rotation direction remains to be "not determinable".

When the finger tip A moves to location $P_3$, the distance from $P_2$ is greater than the minimum distance $L_{min}$. The gradient is calculated to be about 0.30 at step S37, and variable G is set to "1" at step S57. Variable D is set to "1" at stop S44, and the rotation direction is determined to be clockwise. Then, the process of step S8 for the case where the rotation direction of the jog dial input is clockwise is performed.

When the finger tip A moves to location $P_4$, the distance from location $P_3$ is about 8.94 being less than the minimum distance $L_{min}$. Variable D is thus set to "0" at step S35 indicating that the rotation direction is not determinable.

When the finger tip A moves to location $P_5$, the distance from location $P_3$ is greater than the minimum distance $L_{min}$. The gradient is calculated to be about −0.80 at step S37, and variable G is set to "1" at step S60. Variable D is set to "1" at step S44. Thus, the rotation direction is again determined to be clockwise.

When the finger tip A moves to location $P_6$, the X-coordinate does not change and, therefore, variable VX is determined to be "0" at step S36. Thus, variable D is set to "0" at step S35 indicating that the rotation direction is not determinable.

However, when the finger tip A moves to location $P_7$, the gradient is calculated to be about 6.50, and variable G is set to "1" at step S60. Variable D is set to "1" at step S44. Thus, the rotation direction is determined to be clockwise.

Similarly, when the finger tip A moves to location $P_8$ the rotation direction is determined to be clockwise.

When the finger tip A moves to location $P_9$, the distance from the second previous to last location $P_7$ is determined to be less than the minimum distance $L_{min}$ at step S51. Therefore, the sign of variable G is inverted at step S52 to be "−1", so that the rotation direction is determined to be counterclockwise.

When the finger tip A moves to location $P_{10}$, variable G is set to "−1" at step S62 so that the rotation direction is again determined to be counterclockwise. Since the rotation direction is determined to be counterclockwise, the process of step S9 for the case where the rotation direction of the jog dial inputs is counterclockwise is performed.

When the finger tip A moves to location $P_{11}$, the last gradient is calculated to be about 10.63 at step S37, and is determined to be the same as the previous gradient (of the segment between $P_9$ and $P_{10}$) at step S53. Variable D is thus set to "0" at step S54 indicating that the rotation direction is not determinable.

However, when the finger tip A moves to location $P_{12}$, the gradient is calculated to be about 14.42 at step S37. Variable G is thus set to "1" at step S57, returning to the processes for the case where the rotation direction of the jog dial inputs is clockwise. However, after the finger tip A moves to location $P_{11}$ and step S54 is completed, the jog dial process is terminated while skipping step S42.

As described above, the input operation similar to that using a jog dial input device can be realized by sliding the finger tip A in a circular manner on the panel surface 1a of the mouse pad 1. Therefore, a long-stroke command can be easily made within a small operation area. As shown in the flow charts of FIGS. 6 and 7, the rotation direction is determined based on simple calculations such as obtaining and comparing gradients. Thus, real-time operations can be ensured.

In the present example, it is also applicable to obtain the angle defined by the previous and the last linear segments based on Expressions 1 and 4 above. In such a case, the rotation direction is easily determined from the sign of the angle, while avoiding a divide-by-zero error.

Moreover, when the absolute value of the angle is close to π, sudden inversion of the rotation direction can be more accurately detected. Again, when the rotation direction is determined based on the gradients of the linear segments as described in the present example, there is much less load on the processing unit, thereby easily ensuring the real-time operation.

EXAMPLE 2

Hereinafter, a jog dial emulation input device according to Example 2 of the present invention will be described.

Figure 20:
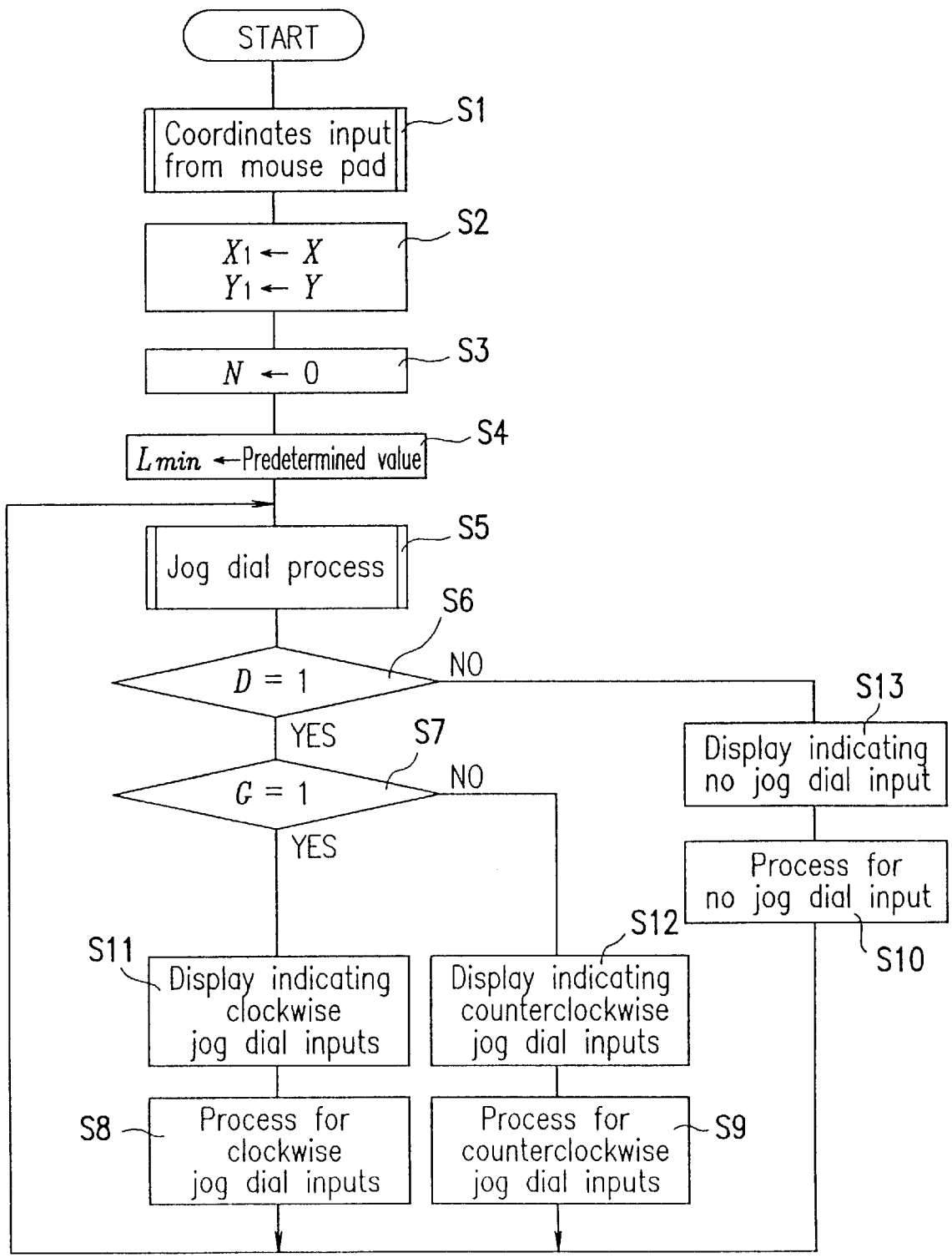
FIG. 20 is a flow chart of Example 2 of the present invention illustrating the processes performed for inputs from the mouse pad.

FIG. 20 shows the processes performed by the jog dial emulation input device of Example 2. Herein, components in FIG. 20 that function in the same manner as those in FIGS. 1 to 3 and 5 to 7 in Example 1 are referred to by the same reference numerals and will not be further described in Example 2.

The configuration of Example 2 is the same as that of Example 1 except for a program stored in the memory 3. The difference between the process of Example 2 and the process of the Example 1 will now be described.

In FIG. 20, steps S11 to S13 are added to the processes shown in FIG. 4.

Step S11 is for providing for a display on the display device 15 by employing the display driving circuit 14 (shown in FIG. 3), for indicating that the rotation direction of the jog dial inputs it clockwise. Step S11 is inserted between step S8 and step S7. The display indicating a clockwise rotation is performed when variable G is determined to be "1" at step S7 and, therefore, the process of step S8 for the case where the rotation direction of the jog dial inputs is clockwise is to be performed.

Step S12 is for performing display on the display device 15 indicating that the rotation direction of the jog dial inputs is counterclockwise. Step S12 is inserted between step S7 and step S9. The display indicating a counterclockwise rotation is performed when variable G is determined to be "−1" at step S7 and, therefore, the process of step S9 for the case where the rotation direction of the jog dial inputs is counterclockwise is to be performed.

Step S13 is for performing display on the display device 15 indicating that there is no jog dial input. Step S13 is inserted between step S6 and step S10. The display indicating no jog dial input is performed when variable D is determined to be "0" at step S6 and, therefore, the process of step S10 for the case of no jog dial input is to be performed.

For example, a numeral "1" is displayed in a certain area on the display screen of the display device 15 to indicate that the rotation direction is clockwise; a numeral "−1" is similarly displayed to indicate that the rotation direction is counterclockwise; and "0" is similarly displayed to indicate that there is no jog dial input.

The user can thus ensure that the rotation direction is being properly recognized by looking at the display. Thus, the user can slide his finger tip A in a circular manner on the panel surface 1a of the mouse pad 1 while checking the rotation direction. Sliding the finger tip A in a circular manner is usually an easy operation for most users. However, some users who are not used to these operations may slide the finger tip A in an excessively small circle, which cannot be recognized as a circular stroke. The jog dial emulation input device of Example 2 can offer a practice opportunity allowing such users to practice the input operation using the mouse pad 1.

In place of displaying a numeral, arrows and the like corresponding to the rotation direction may be displayed so as to better indicate the rotation direction.

In the case of the flow chart of FIG. 20, steps S11 to S13 may be performed when CPU 11 performs corresponding one of steps S8 to S10. CPU 11 may also perform processes similar to step S6 or S7 when CPU 11 reads out variables D and G indicating the determinability of the rotation direction and the determined rotation direction so as to perform steps S11 to S13.

EXAMPLE 3

Hereinafter, a jog dial emulation input device according to Example 3 of the present invention will be described.

Figure 21:
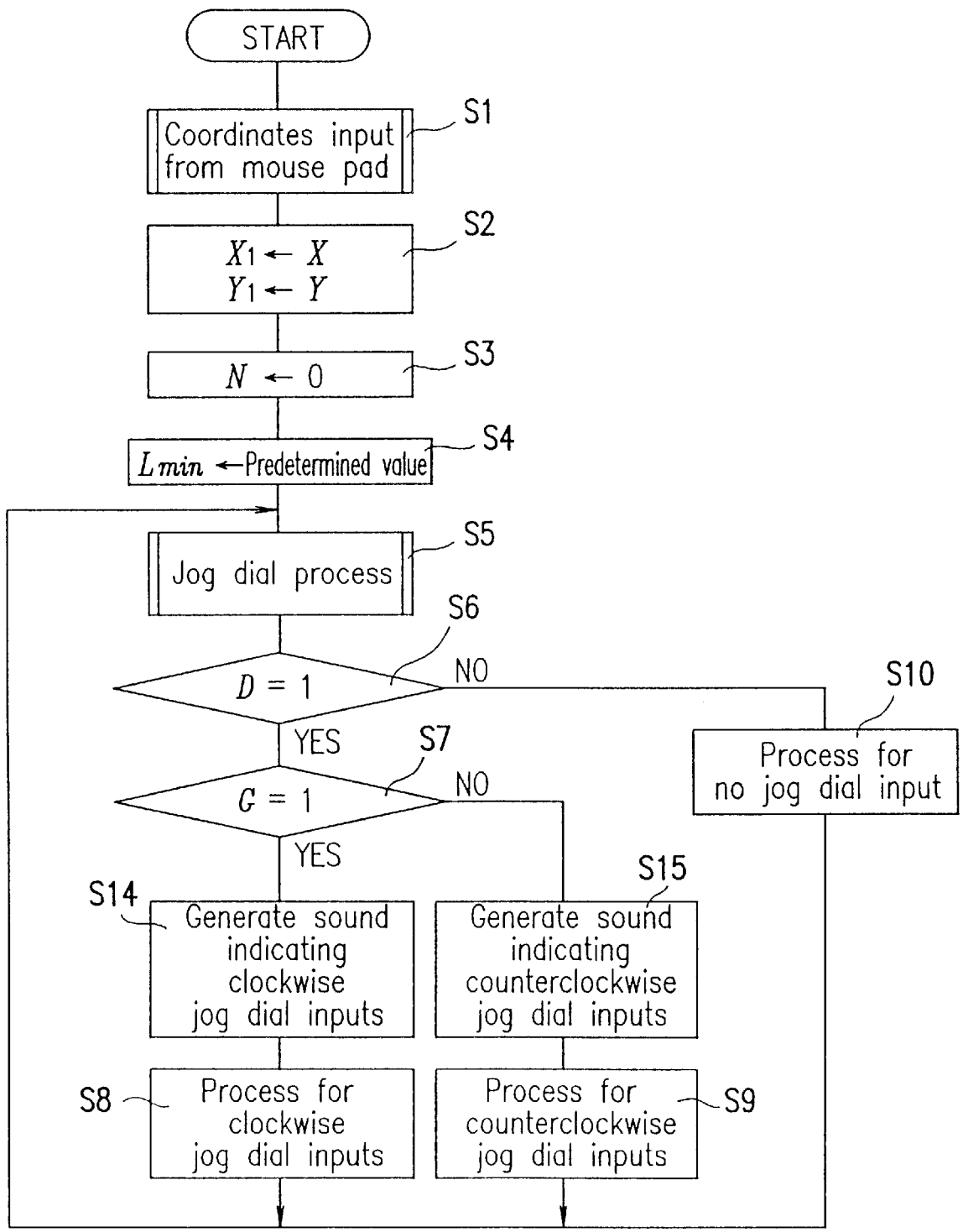
FIG. 21 is a flow chart of Example 3 of the present invention illustrating the processes performed for inputs from the mouse pad.

FIG. 21 shows the processes performed by the jog dial emulation input device of Example 3. Herein, components in FIG. 21 that function in the same manner as those in FIGS. 1 to 3 and 5 to 7 in Example 1 are referred to by the same reference numerals and will not be further described in Example 3.

The configuration of Example 3 is similar to that of Example 1 except for a program stored in the memory 3. The difference between the process of Example 3 and the process of the Example 1 will now be described.

In FIG. 21, steps S14 and S15 are added to the processes shown in FIG. 4.

Step S14 is for generating a sound through the loud speaker 17 by employing the sound driving circuit 16

(shown in FIG. 3), for indicating that the rotation direction of the jog dial inputs is clockwise. Step S14 is inserted between step S7 and step S8. The sound indicating a clockwise rotation is generated when variable G is determined to be "1" at step S7 and, therefore, the process of step S8 for the case where the rotation direction of the jog dial inputs is clockwise is to be performed.

Step S15 is for generating a sound through the loud speaker 17 indicating that the rotation direction of the jog dial inputs is counterclockwise. Step S15 is inserted between step S7 and step S9. The sound indicating a counterclockwise rotation is generated when variable G is determined to be "−1" at step S7 and, therefore, the process of step S9 for the case where the rotation direction of the jog dial inputs is counterclockwise is to be performed.

For example, a high-tone sound is generated through the loud speaker 17 or the like to indicate that the rotation direction is clockwise, and a low-tone sound, being lower than the sound indicating a clockwise rotation, is similarly generated to indicate that the rotation direction is counterclockwise.

As in Example 2 (where the rotation direction is indicated on the display screen), the user can slide the finger tip A in a circular manner on the panel surface 1a of the mouse pad 1 while knowing that the rotation direction is being properly recognized by hearing the high-tone sound or the low-tone sound distinctively from each other.

Other types of sounds or synthesized voices may also be used to indicate the rotation direction. Moreover, steps S14 and S15 may also be performed by a device driver or the like.

EXAMPLE 4

Hereinafter, a jog dial emulation input device according to Example 4 of the present invention will be described.

Figure 22:
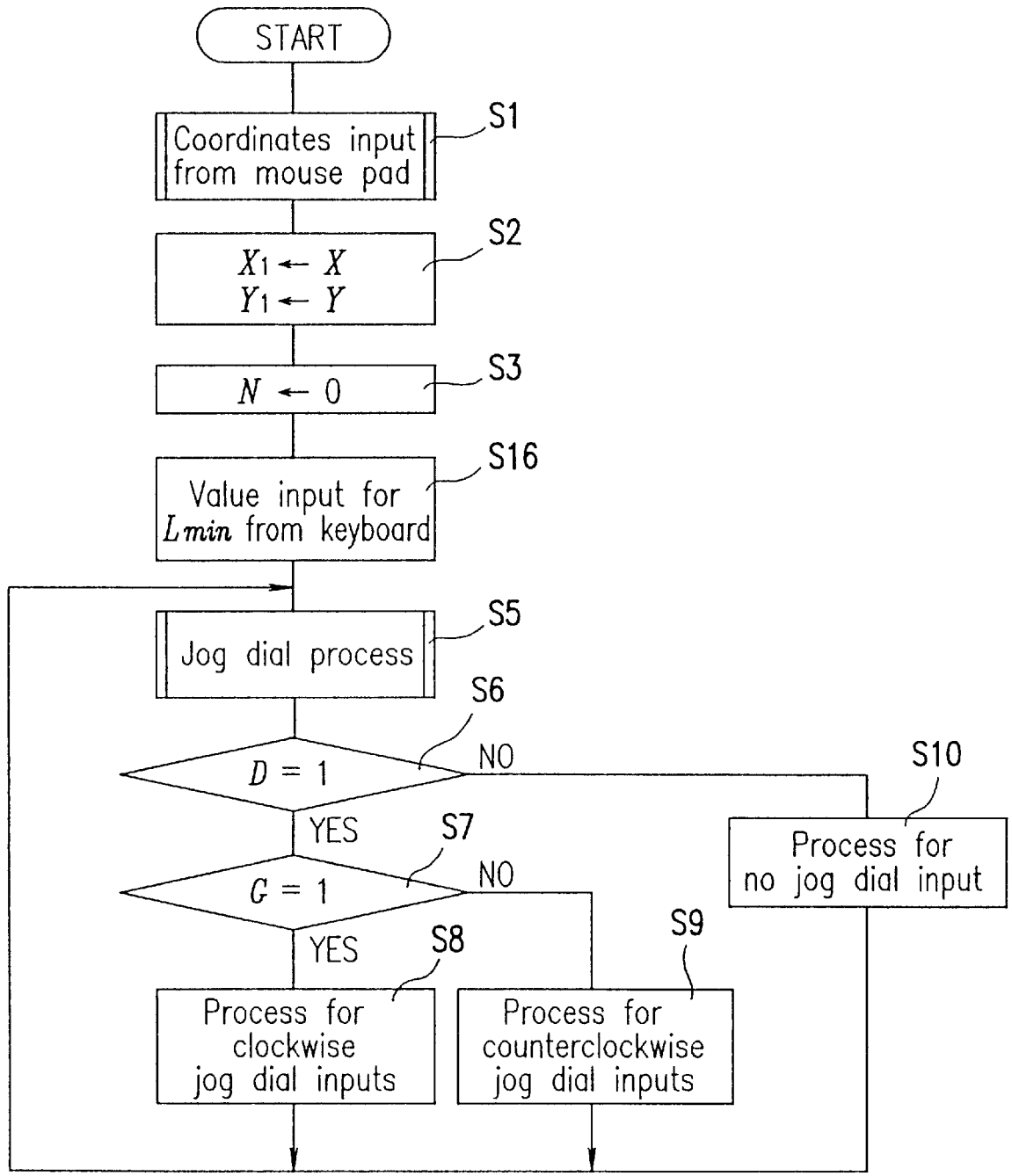
FIG. 22 is a flow chart of Example 4 of the present invention illustrating the processes performed for inputs from the mouse pad.

FIG. 22 shows the processes performed by the jog dial emulation input device of Example 4. Herein, components in FIG. 22 that function in the same manner as those in FIGS. 1 to 3 and 5 to 7 in Example 1 are referred to by the same reference numerals and will not be further described in Example 4.

The configuration of Example 4 is similar to that of Example 1 except for a program stored in the memory 3. The difference between the process of Example 4 and the process of the Example 1 will now be described.

As compared to FIG. 4, step S16 is performed in place of step S4 in FIG. 22.

At step S4 in FIG. 4, CPU 2 sets the minimum distance $L_{min}$ stored in the minimum distance memory 8 (FIG. 1) to a predetermined value. On the other hand, at step S16 in FIG. 22, a value is input through the keyboard 13 (FIG. 3) for altering the minimum distance $L_{min}$ to the input value. After the initialization process Of steps S1 to S3 in FIG. 22, the user can input a value through the keyboard 13 so as to alter the value of the minimum distance $L_{min}$. The minimum distance $L_{min}$ determines the response parameter of the mouse pad 1 in the jog dial input mode. The response parameter can be thus adjusted according to the user's preference or to the operation to be performed. For example, when the user wishes to quickly select an article from the menu list, the user can make a quick circular stroke by the finger tip A on the mouse pad 1. Instead, the user can set the response parameter to a relatively small value to increase the number of times the rotation direction is determined, whereby the user can similarly perform a quick selection.

The updating operation of the minimum distance $L_{min}$ is accepted as shown in FIG. 22. The updating operation is included in the initialization process for the jog dial process. However, step S16 may be independent from steps S1 to S3 and S5 to S10, so that step S16 can be performed on a command from the keyboard 13 or the like. The value for the minimum distance $L_{min}$ may also be input through the mouse pad 1 or other input devices as well as from the keyboard 13.

EXAMPLE 5

Hereinafter, a jog dial emulation input device according to Example 5 of the present invention will be described.

In Example 5, the jog dial input mode and the mouse input mode are switched therebetween depending on whether or not a specially assigned key (or "switch key") on the keyboard 13 (FIG. 3) is held down.

Figure 23:
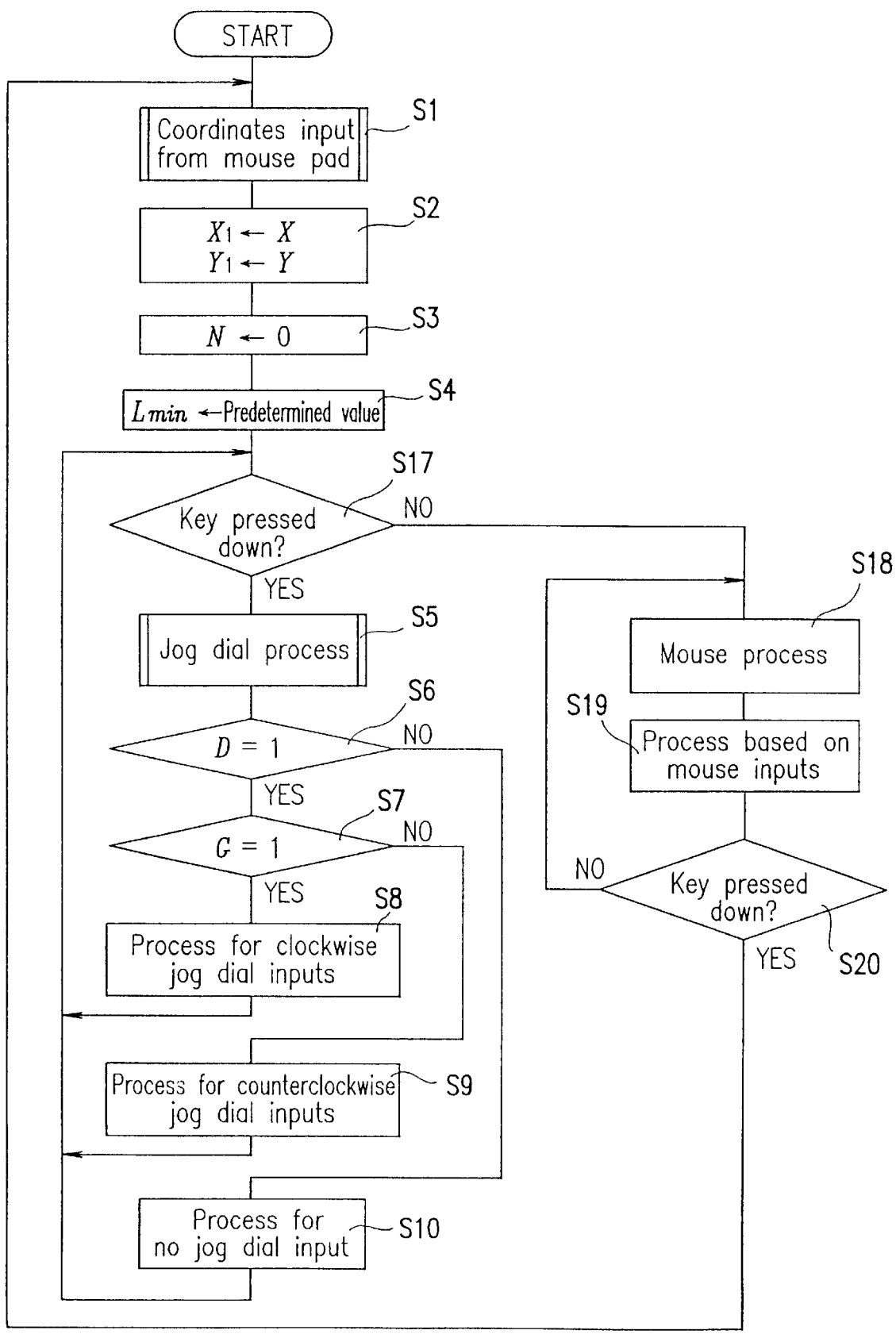
FIG. 23 is a flow chart of Example 5 of the present invention illustrating the processes performed for inputs from the mouse pad.
Figure 24:
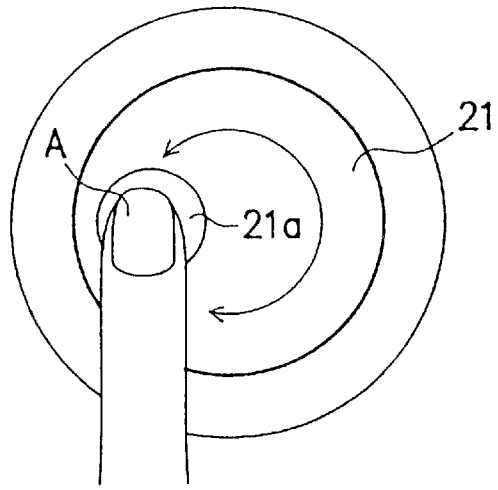
FIG. 24 is a plan view showing a conventional jog dial input device.
Figure 25:
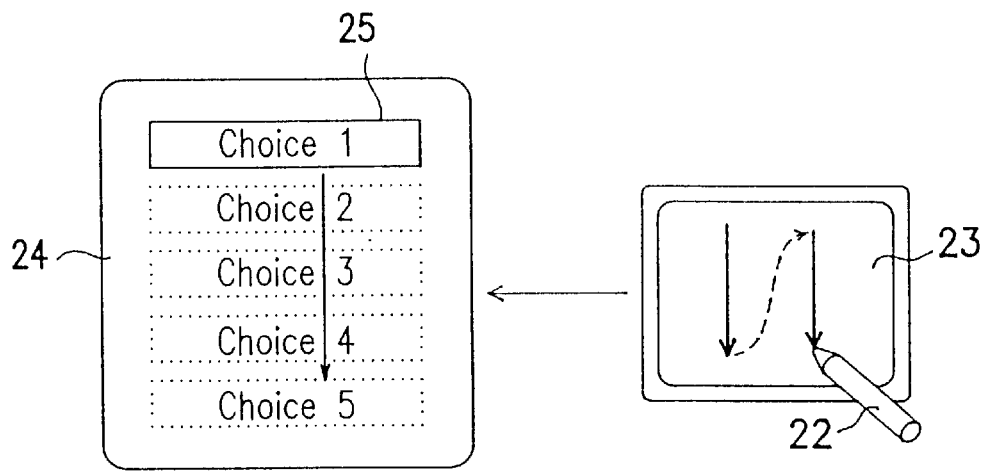
FIG. 25 is a diagram illustrating a conventional operation to select an article from the menu list on a display screen using a stylus pan on a tablet.
Figure 26:
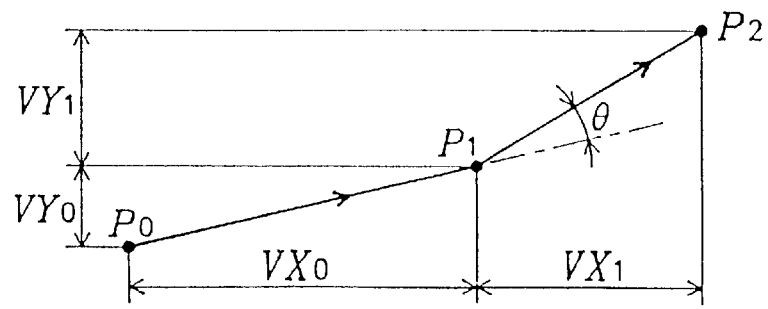
FIG. 26 is a diagram for illustrating a conventional method for computing an angle defined by two vectors.

FIG. 23 shows the processes performed by the jog dial emulation input device of Example 5. Herein, components in FIG. 23 that function in the same manner as those in FIGS. 1 to 3 and 5 to 7 in Example 1 are referred to by the same reference numerals and will not be further described in Example 5.

The configuration of Example 5 is similar to that of Example 1 except for a program stored in the memory 3. The difference between the process of Example 5 and the process of the Example 1 will now be described.

In FIG. 23, steps S17 to S20 are added to the processes shown in FIG. 4.

Step S17 is for determining whether or not the assigned key on the keyboard 13 is held down. Step S17 is inserted between step S4 and step S5 for the jog dial process. Only when the assigned key is held down, are steps S5 to S10 for the jog dial process performed. When the assigned key is not held down, steps S18 to S20 are performed.

Step S18 is for the mouse process by using the mouse pad 1, where the mouse pad 1 emulates an ordinary mouse.

At step S19, CPU 11 executes an application program or the like based on mouse inputs obtained in the mouse process. At step S20, after the process based on the mouse inputs, whether or not the assigned key is held down is determined as in step S17. When the assigned key is not held down, CPU 11 returns to step S18 so as to repeat the mouse process. When the switch key is held down, CPU 11 returns to step S1. After the initialization process for the jog dial process, steps S5 to S10 are repeated while the switch key is held down.

The jog dial input mode is likely to be used only in limited situations. Therefore, it is applicable to design the input modes such that the user is usually on the mouse input mode, and can activate the jog dial input mode by holding down the assigned key as the user wishes to perform an operation such as to scroll the display by a large distance. Such switching between the input modes requires no bothersome operations.

Alt key (ALT), control key (CTRL) or shift key (SHIFT), which is not usually used by itself, or other function keys assigned for special uses may be suitably assigned as the switch key.

Moreover, in lieu of assigning a switch key, the input modes may also be switched by other operations through the keyboard 13, the mouse pad 1 or other input devices.

Although the present invention has been primarily described with respect to a human finger stroke along the panel surface 1a, it is to be understood that the present invention includes other types of user inputs than finger strokes. For example, it will be appreciated that the scope of the present invention is intended to include strokes made by a pen, pencil or other pointing devices, other appendages or parts of the body such as, for example, the palm or heal of a hand.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A jog dial emulation input device comprising:

a pointing device receiving coordinate data on a panel surface;

a memory communicating with the pointing device, the memory storing coordinate data of consecutive positions of the pointing device;

a rotation direction detector communicating with the memory, the rotation direction detector determining a rotation direction of a user input to the panel surface to be clockwise or counterclockwise based on the consecutive position coordinate data received by the pointing device; and a direction indicator communicating with the rotation direction detector, the direction indicator converting the rotation direction determined by the rotation direction detector to output signals indicative of a unitary direction of the pointing device.

2. A jog dial emulation input device according to clam 1, wherein the direction indicator converts the rotation direction determined by the rotation direction detector to the output signals, the output signals indicating a direction in which a bidirectional parameter is varied.

3. A jog dial emulation input device according to claim 1, wherein the output signals from the direction indicator move a cursor in a direction according to the rotation direction determined by the rotation direction detector.

4. A jog dial emulation input device according to claim 1, further comprising a rotation direction display, and wherein the output signals from the direction indicator are applied to the rotation direction display for displaying the rotation direction determined by the rotation direction detector.

5. A jog dial emulation input device according to claim 1, further comprising a rotation direction sound generator, and wherein the output signals from the direction indicator are applied to the rotation direction sound generator for generating sound indicating the rotation direction determined by the rotation direction detector.

6. A jog dial emulation input device comprising:

a pointing device for receiving coordinate data on a panel surface;

a rotation direction detector for determining a rotation direction of a user input to the panel surface to be clockwise or counterclockwise based on the coordinate data received by the pointing device; and a direction indicator for converting the rotation direction determined by the rotation direction detector to output signals, wherein:

a first location and a second location are received by the pointing device, and when a distance between the first location and the second location is less than a predetermined distance, the determination of the rotation direction is not performed.

7. A jog dial emulation input device according to claim 6, further comprising a response parameter updator for altering the predetermined distance.

8. A jog dial emulation input device comprising:

a pointing device for receiving coordinate data on a panel surface;

a rotation direction detector for determining a rotation direction of a user input to the panel surface to be clockwise or counterclockwise based on the coordinate data received by the pointing device;

a direction indicator for converting the rotation direction determined by the rotation direction detector to output signals;

a mouse emulator for performing mouse inputs based on a relative chance from a first location to a second location, the first and second locations being received by the pointing device;

an input device for receiving an input signal; and input mode switch for switching between the mouse input mode and an input mode based on the rotation direction detector according to the input signal.

9. A jog dial emulation input device according to claim 1, wherein:

the pointing device receives a first location, a second location, and a third location; and the rotation direction detector determines a rotation direction to be clockwise or counterclockwise based on a gradient of a straight line defined by the first location and the second location and a gradient of a straight line defined by the second location and the third location.

10. A jog dial emulation input device comprising:

a pointing device receiving coordinate data on a panel surface;

a memory communicating with the pointing device, the memory storing coordinate data corresponding to at least three consecutive positions of the pointing device; and a rotation direction detector communicating with the memory, the rotation direction detector determining a rotation direction of a user input to the panel surface based on a comparison of corresponding consecutive linear segments between the at least three consecutive positions of the pointing device, the rotation direction being indicative of a unitary direction of the pointing device.

11. A jog dial emulation input device according to claim 10, wherein a predetermined minimum length of the linear segments determines a response parameter of the device.

12. A jog dial emulation input device according to claim 11, wherein the coordinate data is canceled if one of the linear segments length is less than the predetermined minimum length.

* * * * *